US011987059B2

(12) United States Patent
Kosuge et al.

(10) Patent No.: US 11,987,059 B2
(45) Date of Patent: May 21, 2024

(54) INKJET PRINTING APPARATUS AND CONTROL METHOD OF THE SAME

(71) Applicant: CANON KABUSHIKI KAISHA, Tokyo (JP)

(72) Inventors: Junya Kosuge, Kawasaki (JP); Yumi Mukoyama, Kawasaki (JP); Toshiaki Tokisawa, Kawasaki (JP); Tsuyoshi Saeki, Kawasaki (JP); Takashi Abe, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/172,367

(22) Filed: Feb. 22, 2023

(65) Prior Publication Data

US 2023/0202191 A1 Jun. 29, 2023

Related U.S. Application Data

(63) Continuation of application No. 17/189,310, filed on Mar. 2, 2021, now Pat. No. 11,618,264, which is a (Continued)

(30) Foreign Application Priority Data

Jul. 7, 2017 (JP) ................................ 2017-133664
Jul. 7, 2017 (JP) ................................ 2017-133779

(51) Int. Cl.
*B41J 2/18* (2006.01)
*B41J 2/175* (2006.01)
(Continued)

(52) U.S. Cl.
CPC ................ *B41J 2/18* (2013.01); *B41J 2/175* (2013.01); *B41J 2/17596* (2013.01); *B41J 2/19* (2013.01);
(Continued)

(58) Field of Classification Search
CPC . B41J 2/17596; B41J 2/18; B41J 29/02; B41J 2/175; B41J 29/38; B41J 2/19; B41J 2202/07; B41J 2202/12
See application file for complete search history.

(56) References Cited

U.S. PATENT DOCUMENTS 8,235,494 B2 8/2012 Kaiho
8,240,823 B2 8/2012 Murakami
(Continued)

FOREIGN PATENT DOCUMENTS

JP 2006-088564 A 4/2006
JP 2008-023806 A 2/2008
(Continued)

OTHER PUBLICATIONS

Apr. 4, 2023 Japanese Official Action in Japanese Patent Appln. No. 2022-020280.
(Continued)

*Primary Examiner* — An H Do
(74) *Attorney, Agent, or Firm* — Venable LLP

(57) ABSTRACT

An inkjet printing apparatus includes a tank in which ink is contained; a print head for ejecting ink supplied from the tank to perform print operation; a supply flow path for supplying ink from the tank to the print head; a collection flow path for collecting ink from the print head to the tank; and a pump provided in the supply flow path or the collection flow path. The pump is driven, during print operation, at a first speed to circulate ink within a circulation path including the tank, the supply flow path, the print head, and the collection flow path, and the pump is driven, from a start of the ink circulation until a lapse of predetermined time period, at a second speed which is faster than the first speed.

22 Claims, 23 Drawing Sheets

Related U.S. Application Data continuation of application No. 16/813,847, filed on Mar. 10, 2020, now Pat. No. 10,960,678, which is a continuation of application No. 16/018,592, filed on Jun. 26, 2018, now Pat. No. 10,632,758.

(51) Int. Cl.

| | |
|---|---|
| ***B41J 2/19*** | (2006.01) |
| ***B41J 29/02*** | (2006.01) |
| ***B41J 29/38*** | (2006.01) |

(52) U.S. Cl.

CPC ............... *B41J 29/02* (2013.01); *B41J 29/38* (2013.01); *B41J 2202/07* (2013.01); *B41J 2202/12* (2013.01)

(56) References Cited

U.S. PATENT DOCUMENTS

| | | | | |
|---|---|---|---|---|
| 8,403,439 | B2 | 3/2013 | Tanaka | |
| 8,449,087 | B2 | 5/2013 | Kataoka | |
| 8,529,039 | B2 | 9/2013 | Shibata | |
| 8,579,422 | B2 | 11/2013 | Matsuoka | |
| 8,616,690 | B2 * | 12/2013 | Saito | B41J 2/17596 347/85 |
| 9,162,507 | B2 * | 10/2015 | Tanaka | B41J 29/393 |
| 9,914,307 | B2 | 3/2018 | Kobayashi | |
| 10,569,562 | B2 * | 2/2020 | Nakajima | B41J 2/17513 |
| 10,589,535 | B2 * | 3/2020 | Saeki | B41J 2/17596 |
| 10,632,758 | B2 | 4/2020 | Kosuge | |
| 10,759,181 | B2 | 9/2020 | Tokisawa | |
| 10,960,678 | B2 | 3/2021 | Kosuge | |
| 11,034,159 | B2 * | 6/2021 | Saeki | B41J 29/02 |
| 11,167,559 | B2 * | 11/2021 | Okude | B41J 29/38 |
| 2009/0009568 | A1 | 1/2009 | Wada | |
| 2010/0141722 | A1 | 6/2010 | Saito | |
| 2011/0074892 | A1 | 3/2011 | Murakami | |
| 2011/0199418 | A1 | 8/2011 | Kaiho | |
| 2012/0033003 | A1 | 2/2012 | Tanaka | |
| 2012/0162331 | A1 | 6/2012 | Kataoka | |
| 2012/0188316 | A1 | 7/2012 | Matsuoka | |
| 2016/0059547 | A1 | 3/2016 | Kaneko | |
| 2016/0159089 | A1 | 6/2016 | Kaneko | |
| 2016/0159102 | A1 | 6/2016 | Kaneko | |
| 2017/0057241 | A1 | 3/2017 | Ueda | |
| 2017/0151806 | A1 | 6/2017 | Kobayashi | |

FOREIGN PATENT DOCUMENTS

| | | | |
|---|---|---|---|
| JP | 2008-055646 | A | 3/2008 |
| JP | 2010-069669 | A | 4/2010 |
| JP | 2010-155449 | A | 7/2010 |
| JP | 2010-274448 | A | 12/2010 |
| JP | 2011-073362 | A | 4/2011 |
| JP | 2011-168039 | A | 9/2011 |
| JP | 2012-056306 | A | 3/2012 |
| JP | 2012-135925 | A | 7/2012 |
| JP | 2011-079169 | A5 | 8/2012 |
| JP | 2012-152972 | A | 8/2012 |
| JP | 2012-218398 | A | 11/2012 |
| JP | 2013-001064 | A | 1/2013 |
| JP | 2015-166159 | A | 9/2015 |
| JP | 2015-193129 | A | 11/2015 |
| JP | 2015-208915 | A | 11/2015 |
| JP | 2016-050546 | A | 4/2016 |
| JP | 2016-137580 | A | 8/2016 |
| JP | 2017-109446 | A | 6/2017 |
| JP | 2019-014161 | A | 1/2019 |

OTHER PUBLICATIONS

May 25, 2021 Japanese Official Action in Japanese Patent Appln. No. 2017-133779.

Aug. 24, 2021 Japanese Official Action in Japanese Patent Appln. No. 2018-129324.

Nov. 2, 2021 Japanese Official Action in Japanese Patent Appln. No. 2017-133779.

Dec. 14, 2021 Japanese Official Action in Japanese Patent Appln. No. 2018-129324.

Oct. 4, 2022 Official Action in Japanese Patent Appln. No. 2021-212906.

Aug. 22, 2023 Japanese Official Action in Japanese Patent Appln. No. 2023-091803.

Aug. 29, 2023 Japanese Official Action in Japanese Patent Appln. No. 2022-020280.

Dec. 12, 2023 Japanese Official Action in Japanese Patent Appln. No. 2023-091803.

Apr. 9, 2024 Japanese Official Action (Decision of Refusal) in Japanese Patent Appln. No. 2023-091803.

Apr. 9, 2024 Japanese Official Action (Decision of Dismal of Amendment) in Japanese Patent Appln. No. 2023-091803.

* cited by examiner

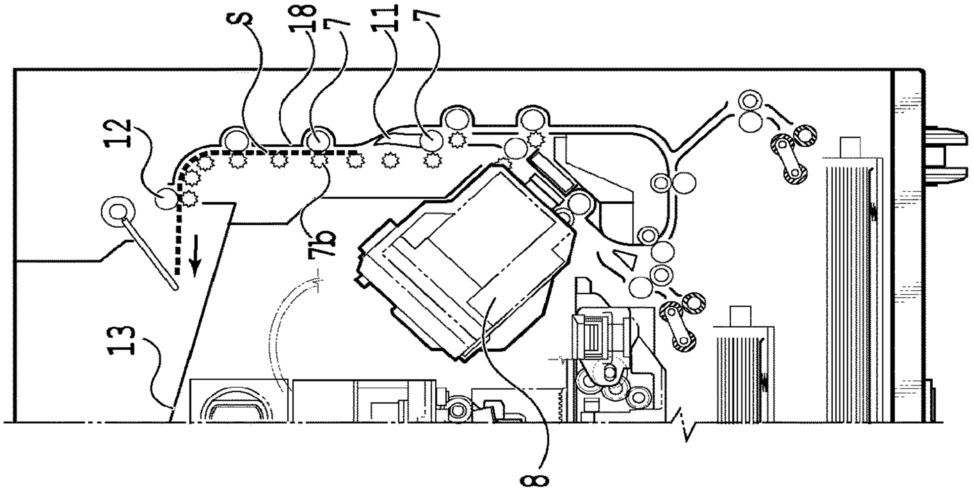
FIG.4C
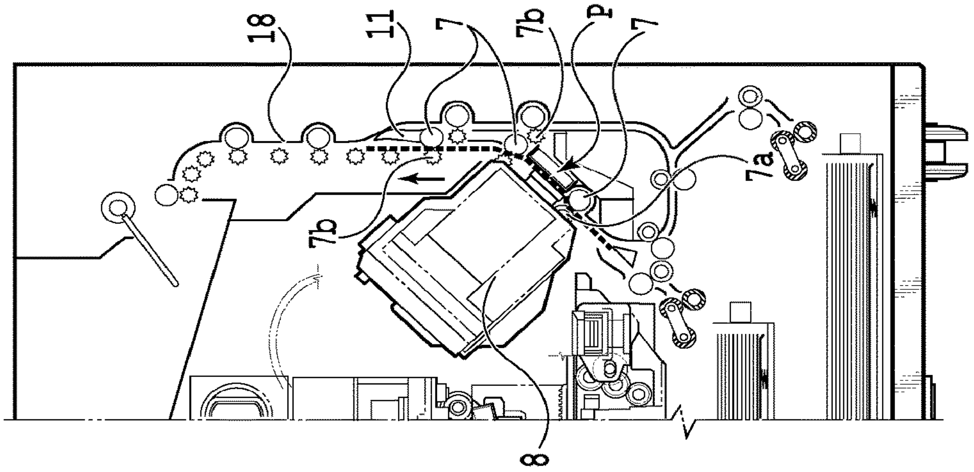
FIG.4B
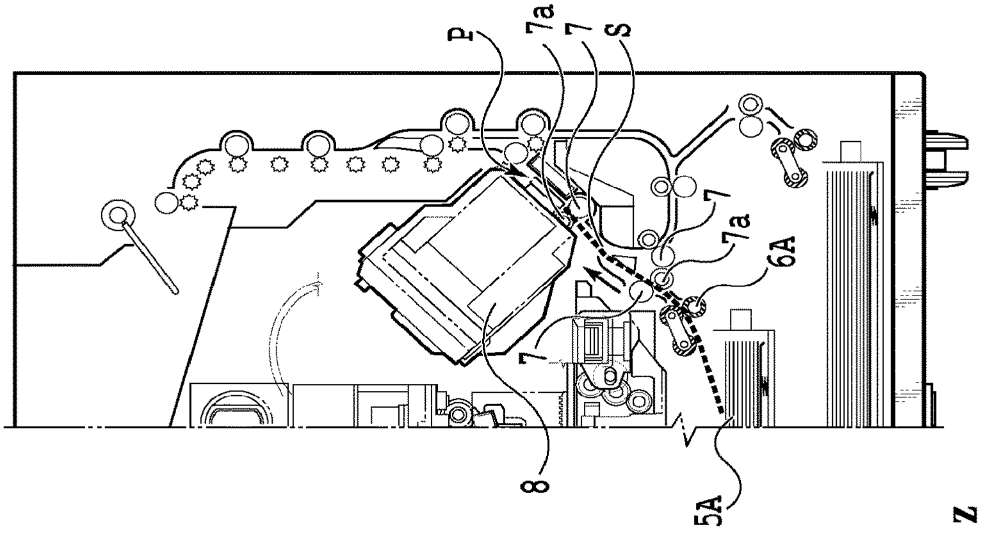
FIG.4A
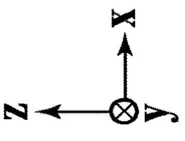

DURING
CIRCULATION

DURING
BUBBLE SHRINKAGE

DURING
STANDBY

DURING
BUBBLE EXPANSION

INKJET PRINTING APPARATUS AND CONTROL METHOD OF THE SAME

This application is a continuation of application Ser. No. 17/189,310 filed Mar. 2, 2021, which is a continuation of application Ser. No. 16/813,847 filed Mar. 10, 2020, U.S. Pat. No. 10,960,678 B2, which is a continuation of application Ser. No. 16/018,592 filed Jun. 26, 2018, U.S. Pat. No. 10,632,758 B2.

BACKGROUND OF THE INVENTION

Field of the Invention

The present invention relates to an inkjet printing apparatus and a control method of the inkjet printing apparatus.

Description of the Related Art

There is an inkjet printing apparatus using an ink circulation system for circulating ink in a pressure chamber which is communicated with an ejection opening that ejects ink. Japanese Patent Laid-Open No. 2011-079169 (hereinafter referred to as PTL 1) discloses a head module including a pressure chamber of an ink circulation type, and discloses an ink circulation supply system for circulating ink in the order of a first main flow path, the head module, and a second main flow path. In PTL 1, a first liquid pump is provided in the first main flow path and a second liquid pump is provided in the second main flow path.

A time period starting from the input of a printing instruction to the start of ejection is called a first print out time (FPOT). In the inkjet printing apparatus using the ink circulation system, ink circulation is stopped in a case where printing operation is not made. In a case of starting the ink circulation in response to the printing instruction in the state where the ink circulation is stopped, an FPOT may possibly take longer.

In a configuration of circulating ink inside the pressure chamber as disclosed in PTL 1, there may be a case where atmosphere is drawn from the ejection opening due to the contraction of air in the flow path according to temperature changes or a case where ink is leaked from the ejection opening due to the expansion of air. For this reason, a buffer chamber may be provided in the circulation path for absorbing the volume change of air in the flow path. As the inside of the circulation path needs to be adjusted to have an appropriate pressure so as to generate ink flow within the pressure chamber of the head module, there may be a possibility that, due to the presence of the buffer chamber, additional time is required and the FPOT takes longer.

SUMMARY OF THE INVENTION

According to one aspect of the present invention, an inkjet printing apparatus comprises a tank in which ink is contained; a print head for ejecting ink supplied from the tank to perform print operation; a supply flow path for supplying ink from the tank to the print head; a collection flow path for collecting ink from the print head to the tank; and a pump provided in the supply flow path or the collection flow path, wherein the pump is driven, during print operation, at a first speed to circulate ink within a circulation path including the tank, the supply flow path, the print head, and the collection flow path, and the pump is driven, from a start of the ink circulation until a lapse of predetermined time period, at a second speed which is faster than the first speed.

Further features of the present invention will become apparent from the following description of exemplary embodiments with reference to the attached drawings.

BRIEF DESCRIPTION OF THE DRAWINGS

FIGS. 4A to 4C are conveying path diagrams of a print medium fed from a first cassette;

DESCRIPTION OF THE EMBODIMENTS

Figure 1:
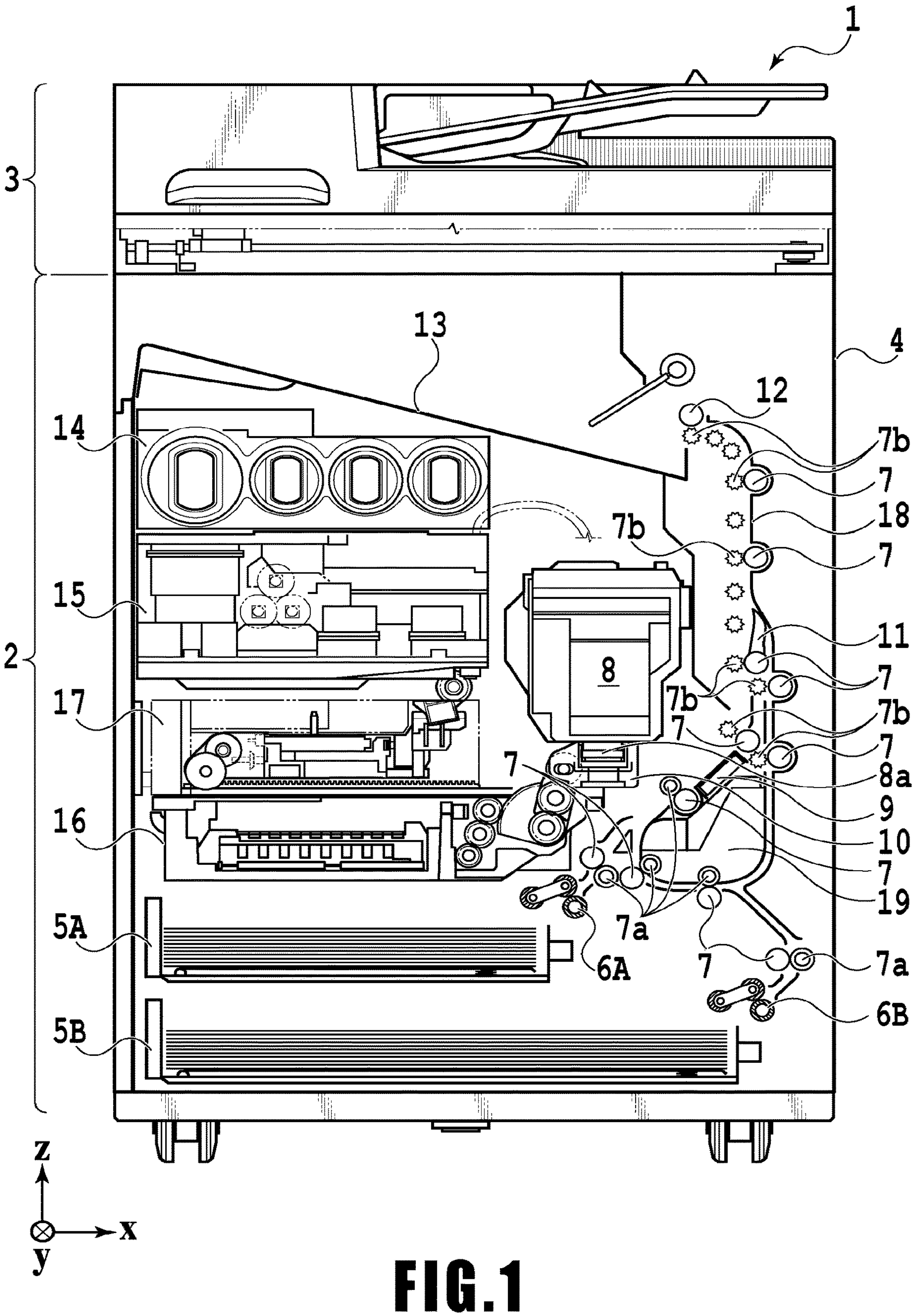
FIG. 1 is a diagram showing a printing apparatus in a standby state.

Embodiments of the present invention will be described below with reference to the drawings. It should be noted that the following embodiments do not limit the present invention and that not all of the combinations of the characteristics described in the present embodiments are essential for solving the problem to be solved by the present invention. Incidentally, the same reference numeral refers to the same component in the following descriptions. Furthermore, relative positions, shapes, and the like of the constituent elements described in the embodiments are exemplary only and are not intended to limit the scope of the invention.

First Embodiment

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing a print medium (cut sheet) S are detachably provided at the bottom of a casing 4 in the vertical direction. A relatively small print medium of up to A4 size is placed flat and housed in the first cassette 5A and a relatively large print medium of up to A3 size is placed flat and housed in the second cassette 5B. A first feeding unit 6A for sequentially feeding a housed print medium is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7*a*, spurs 7*b*, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7*a* are follower rollers that are turned while nipping a print medium S together with the conveying rollers 7. The discharging roller 12 is a drive roller located downstream of the conveying rollers 7 and driven by the conveying motor (not shown). The spurs 7*b* nip and convey a print medium S together with the conveying rollers 7 and discharging roller 12 located downstream of the print head 8.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for placing and housing a print medium S that was subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. In a case where the print head 8 is in a standby position, an ejection opening surface 8*a* of the print head 8 is oriented vertically downward and capped with a cap unit 10 as shown in FIG. 1. In print operation, the orientation of the print head 8 is changed by a print controller 202 described later such that the ejection opening surface 8*a* faces a platen 9. The platen 9 includes a flat plate extending in the y-direction and supports, from the back side, a print medium S subjected to print operation by the print head 8. The movement of the print head 8 from the standby position to a printing position will be described later in detail.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance operation will be described later in detail.

Figure 2:
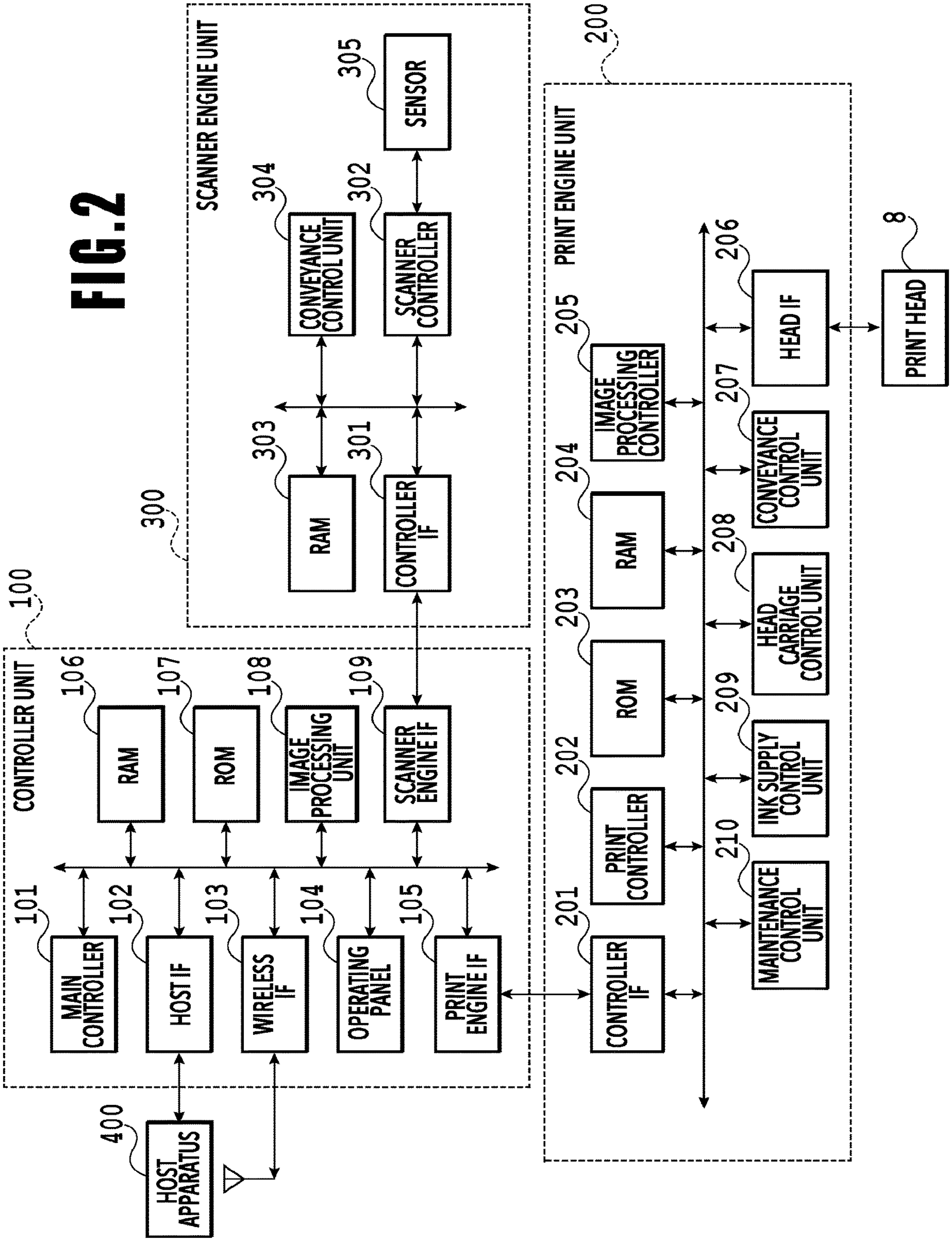
FIG. 2 is a control configuration diagram of the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, in a case where a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, if a scan command is input from the host apparatus 400, the main controller 101 transmits the command to the scanner unit 3 via a scanner engine I/F 109.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203.

Once various commands and image data are received via a controller I/F 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 at the time of performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller I/F 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
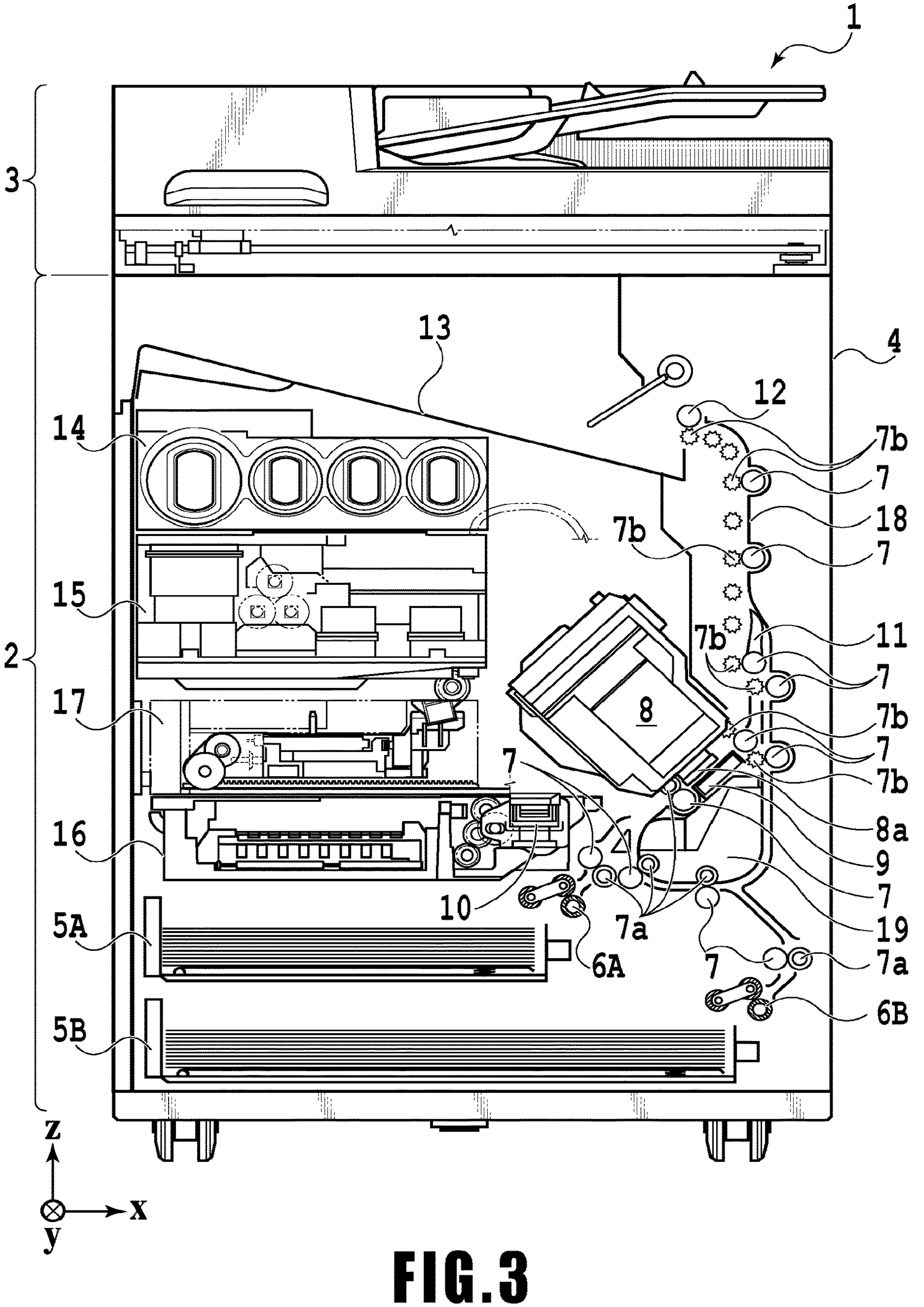
FIG. 3 is a diagram showing the printing apparatus in a printing state.

FIG. 3 shows the printing apparatus 1 in a printing state. As compared with the standby state shown in FIG. 1, the cap unit 10 is separated from the ejection opening surface 8*a* of the print head 8 and the ejection opening surface 8*a* faces the platen 9. In the present embodiment, the plane of the platen 9 is inclined about 45° with respect to the horizontal plane. The ejection opening surface 8*a* of the print head 8 in a printing position is also inclined about 45° with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10*a* from the ejection opening surface 8*a* of the print head 8. The print controller 202 then uses the head carriage control unit 208 to turn the print head 8 45° while adjusting the vertical height of the print head 8 such that the ejection opening surface 8*a* faces the platen 9. After the completion of print operation, the print controller 202 reverses the above procedure to move the print head 8 from the printing position to the standby position.

Next, a conveying path of a print medium S in the print unit 2 will be described. Once a print command is input, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B in accordance with the print command and feed a print medium S.

FIGS. 4A to 4C are diagrams showing a conveying path in the case of feeding an A4 size print medium S from the first cassette 5A. A print medium S at the top of a print medium stack in the first cassette 5A is separated from the rest of the stack by the first feeding unit 6A and conveyed toward a print area P between the platen 9 and the print head 8 while being nipped between the conveying rollers 7 and the pinch rollers 7*a*. FIG. 4A shows a conveying state where the front end of the print medium S is about to reach the print area P. The direction of movement of the print medium S is changed from the horizontal direction (x-direction) to a direction inclined about 45° with respect to the horizontal direction while being fed by the first feeding unit 6A to reach the print area P.

In the print area P, a plurality of ejection openings provided in the print head 8 eject ink toward the print medium S. In an area where ink is applied to the print medium S, the back side of the print medium S is supported by the platen 9 so as to keep a constant distance between the ejection opening surface 8*a* and the print medium S. After ink is applied to the print medium S, the conveying rollers 7 and the spurs 7*b* guide the print medium S such that the print medium S passes on the left of the flapper 11 with its tip inclined to the right and is conveyed along the guide 18 in the vertically upward direction of the printing apparatus 1. FIG. 4B shows a state where the front end of the print medium S has passed through the print area P and the print medium S is being conveyed vertically upward. The conveying rollers 7 and the spurs 7*b* change the direction of movement of the print medium S from the direction inclined about 45° with respect to the horizontal direction in the print area P to the vertically upward direction.

After being conveyed vertically upward, the print medium S is discharged into the discharging tray 13 by the discharging roller 12 and the spurs 7*b*. FIG. 4C shows a state where the front end of the print medium S has passed through the discharging roller 12 and the print medium S is being discharged into the discharging tray 13. The discharged print medium S is held in the discharging tray 13 with the side on which an image was printed by the print head 8 facing down.

Figure 5C:
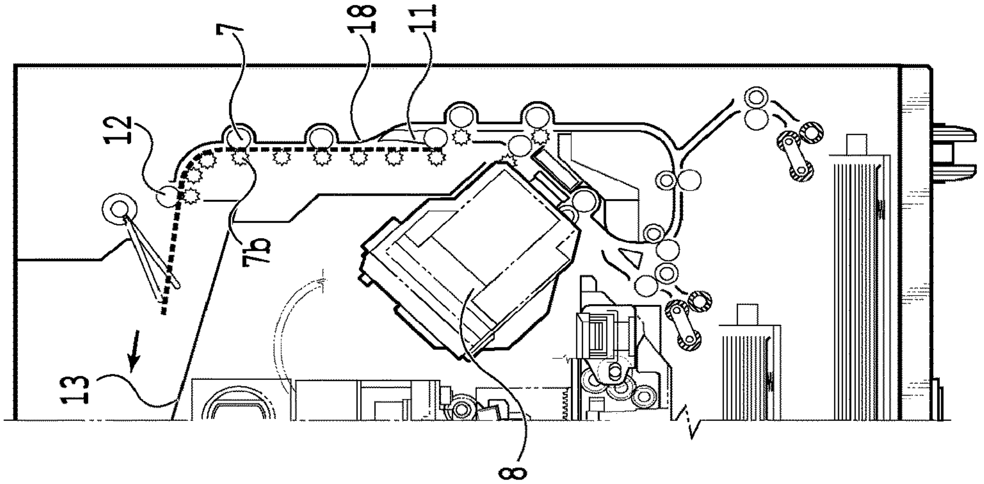
FIGS. 5A to 5C are conveying path diagrams of a print medium fed from a second cassette.
Figure 5B:
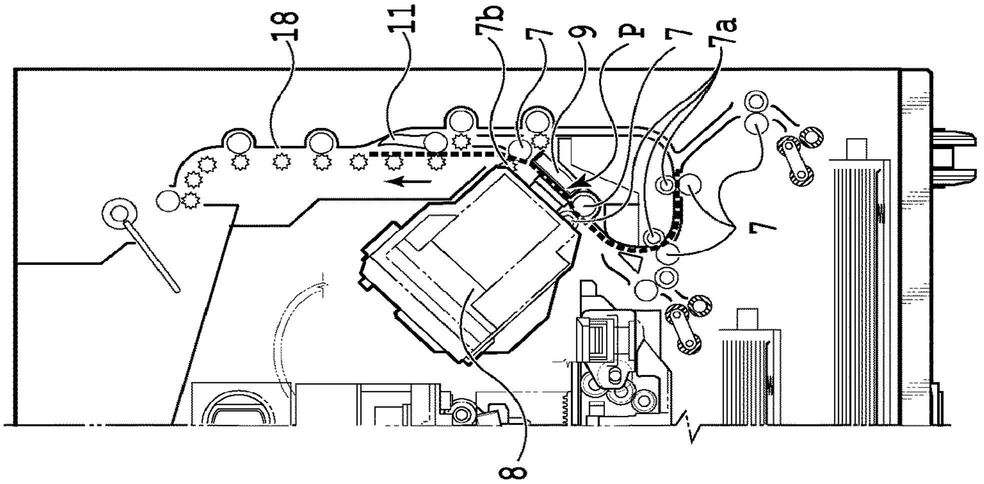
Figure 5A:
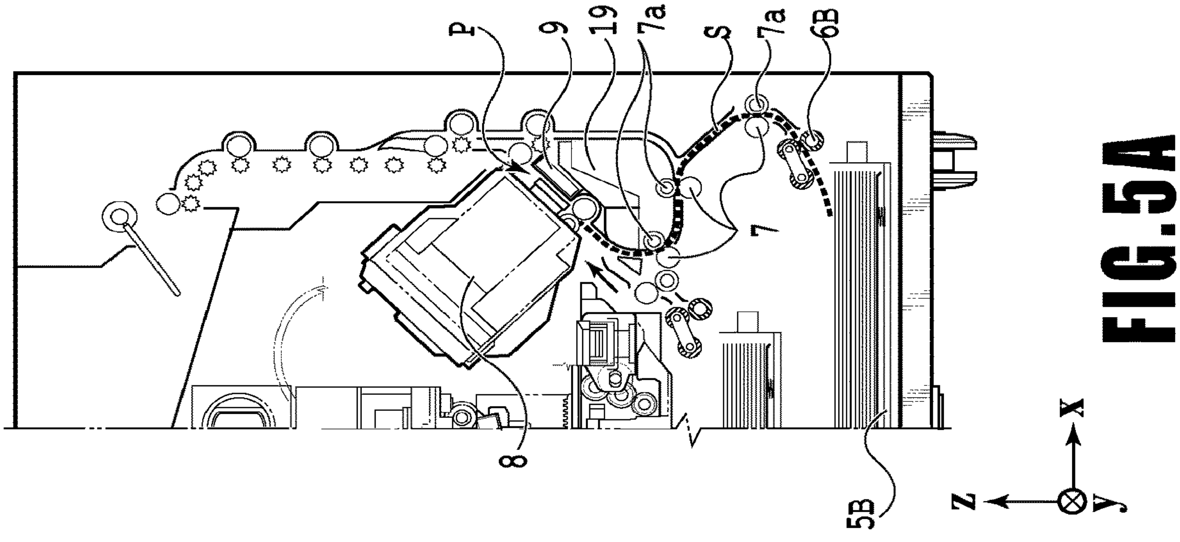

FIGS. 5A to 5C are diagrams showing a conveying path in the case of feeding an A3 size print medium S from the second cassette 5B. A print medium S at the top of a print medium stack in the second cassette 5B is separated from the rest of the stack by the second feeding unit 6B and conveyed toward the print area P between the platen 9 and the print head 8 while being nipped between the conveying rollers 7 and the pinch rollers 7*a*.

FIG. 5A shows a conveying state where the front end of the print medium S is about to reach the print area P. In a part of the conveying path, through which the print medium S is fed by the second feeding unit 6B toward the print area P, the plurality of conveying rollers 7, the plurality of pinch rollers 7*a*, and the inner guide 19 are provided such that the print medium S is conveyed to the platen 9 while being bent into an S-shape.

The rest of the conveying path is the same as that in the case of the A4 size print medium S shown in FIGS. 4B and 4C. FIG. 5B shows a state where the front end of the print medium S has passed through the print area P and the print medium S is being conveyed vertically upward. FIG. 5C shows a state where the front end of the print medium S has passed through the discharging roller 12 and the print medium S is being discharged into the discharging tray 13.

FIGS. 6A to 6D show a conveying path in the case of performing print operation (duplex printing) for the back side (second side) of an A4 size print medium S. In the case of duplex printing, print operation is first performed for the first side (front side) and then performed for the second side (back side). A conveying procedure during print operation for the first side is the same as that shown in FIGS. 4A to 4C and therefore description will be omitted. A conveying procedure subsequent to FIG. 4C will be described below.

Figures 6A, 6B, 6C, 6D:
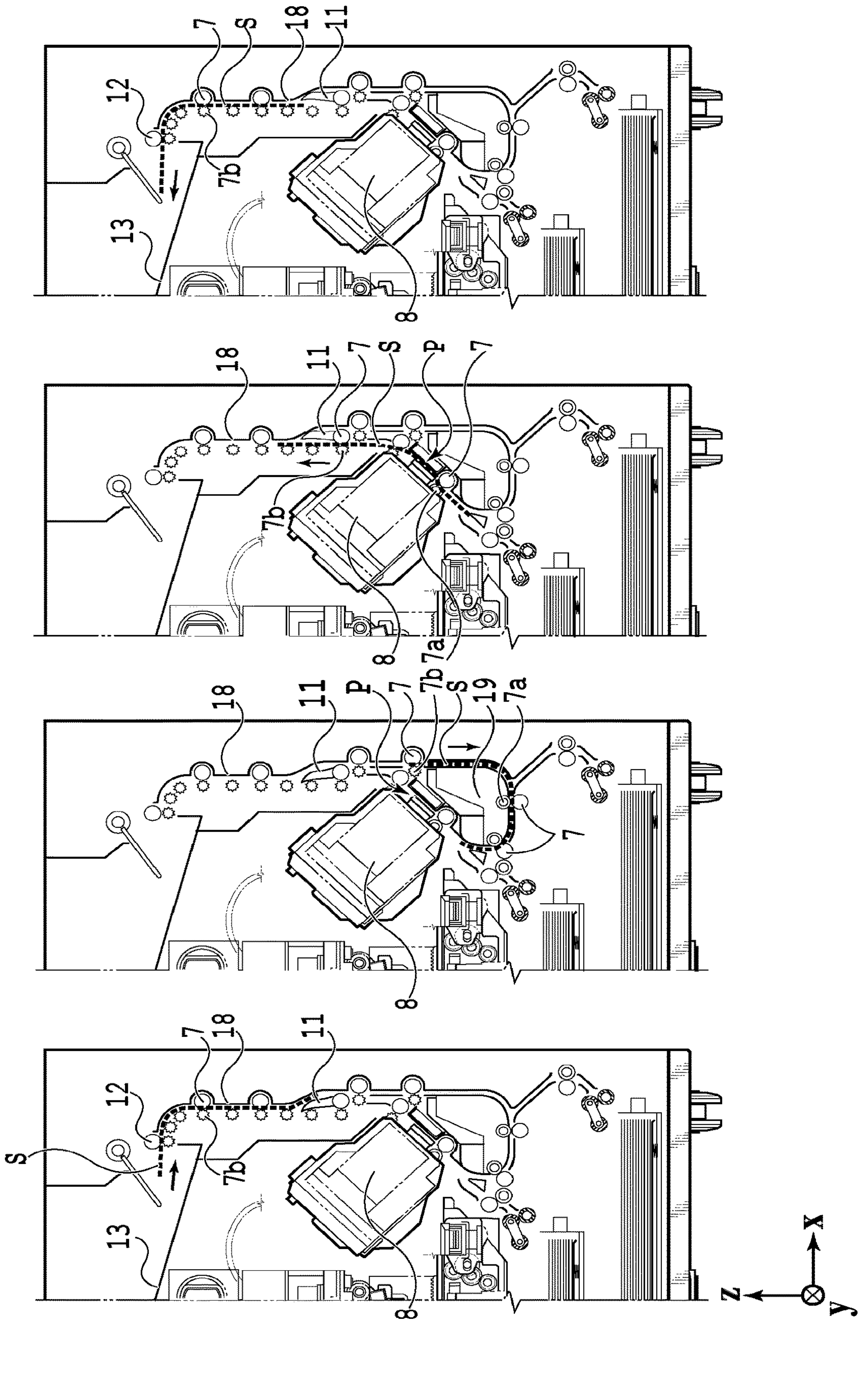
FIGS. 6A to 6D are conveying path diagrams in the case of performing print operation for the back side of a print medium.

After the print head 8 finishes print operation for the first side and the back end of the print medium S passes by the flapper 11, the print controller 202 turns the conveying rollers 7 reversely to convey the print medium S into the printing apparatus 1. At this time, since the flapper 11 is controlled by an actuator (not shown) such that the tip of the flapper 11 is inclined to the left, the front end of the print medium S (corresponding to the back end during the print operation for the first side) passes on the right of the flapper 11 and is conveyed vertically downward. FIG. 6A shows a state where the front end of the print medium S (corresponding to the back end during the print operation for the first side) is passing on the right of the flapper 11.

Then, the print medium S is conveyed along the curved outer surface of the inner guide 19 and then conveyed again to the print area P between the print head 8 and the platen 9. At this time, the second side of the print medium S faces the ejection opening surface 8*a* of the print head 8. FIG. 6B shows a conveying state where the front end of the print medium S is about to reach the print area P for print operation for the second side.

The rest of the conveying path is the same as that in the case of the print operation for the first side shown in FIGS. 4B and 4C. FIG. 6C shows a state where the front end of the print medium S has passed through the print area P and the print medium S is being conveyed vertically upward. At this time, the flapper 11 is controlled by the actuator (not shown) such that the tip of the flapper 11 is inclined to the right. FIG. 6D shows a state where the front end of the print medium S has passed through the discharging roller 12 and the print medium S is being discharged into the discharging tray 13.

(Maintenance Operation)

Next, maintenance operation for the print head 8 will be described. As described with reference to FIG. 1, the maintenance unit 16 of the present embodiment comprises the cap unit 10 and the wiping unit 17 and activates them at predetermined timings to perform maintenance operation.

Figure 7:
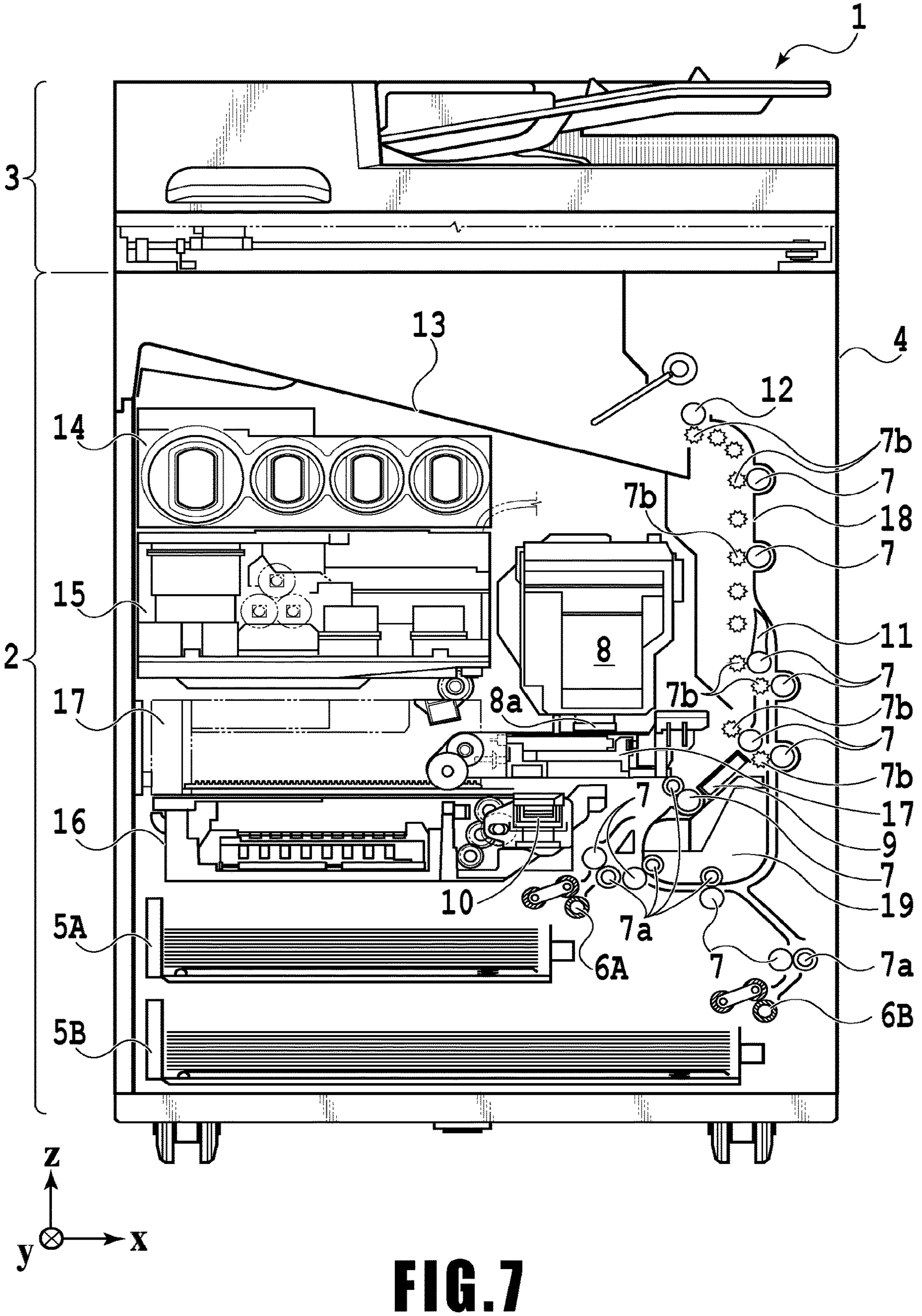
FIG. 7 is a diagram showing the printing apparatus in a maintenance state.

FIG. 7 is a diagram showing the printing apparatus 1 in a maintenance state. In the case of moving the print head 8 from the standby position shown in FIG. 1 to a maintenance position shown in FIG. 7, the print controller 202 moves the print head 8 vertically upward and moves the cap unit 10 vertically downward. The print controller 202 then moves the wiping unit 17 from the evacuation position to the right in FIG. 7. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 7, the print controller 202 moves the print head 8 vertically upward while turning it 45°. The print controller 202 then moves the wiping unit 17 from the evacuation position to the right. Following that, the print controller 202 moves the print head 8 vertically downward to the maintenance position where maintenance operation can be performed by the maintenance unit 16.

Figure 8A:
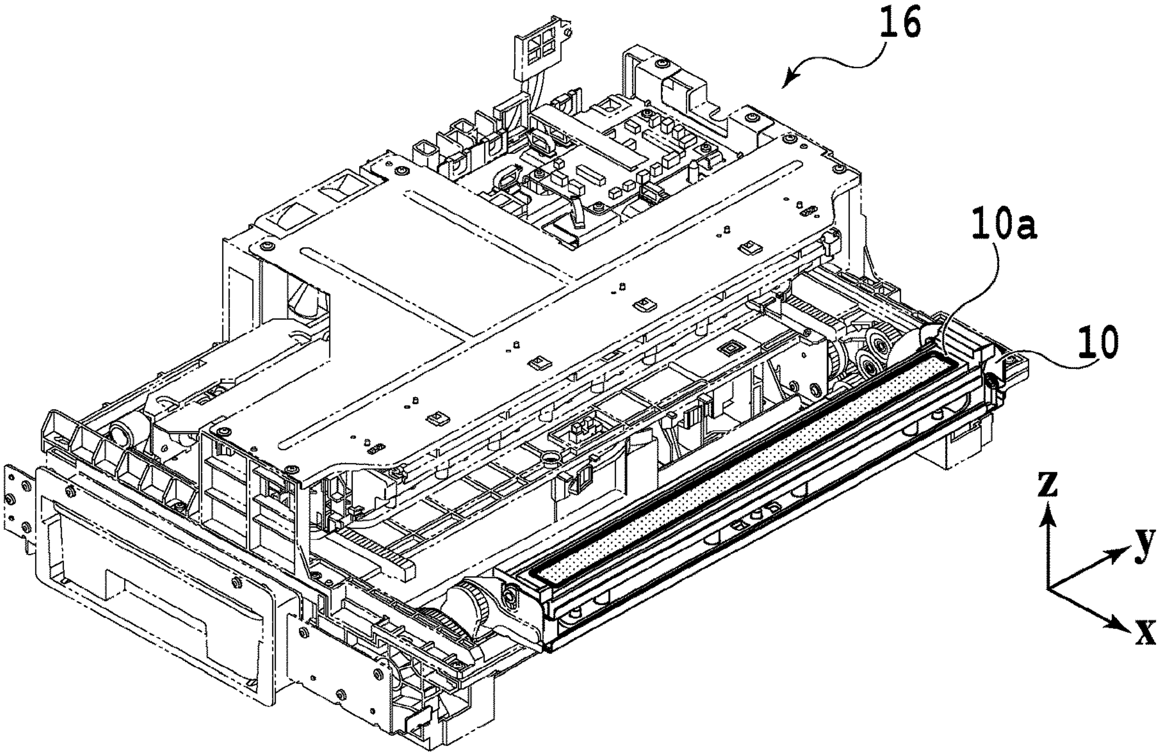
FIGS. 8A and 8B are perspective views showing the configuration of a maintenance unit.
Figure 8B:
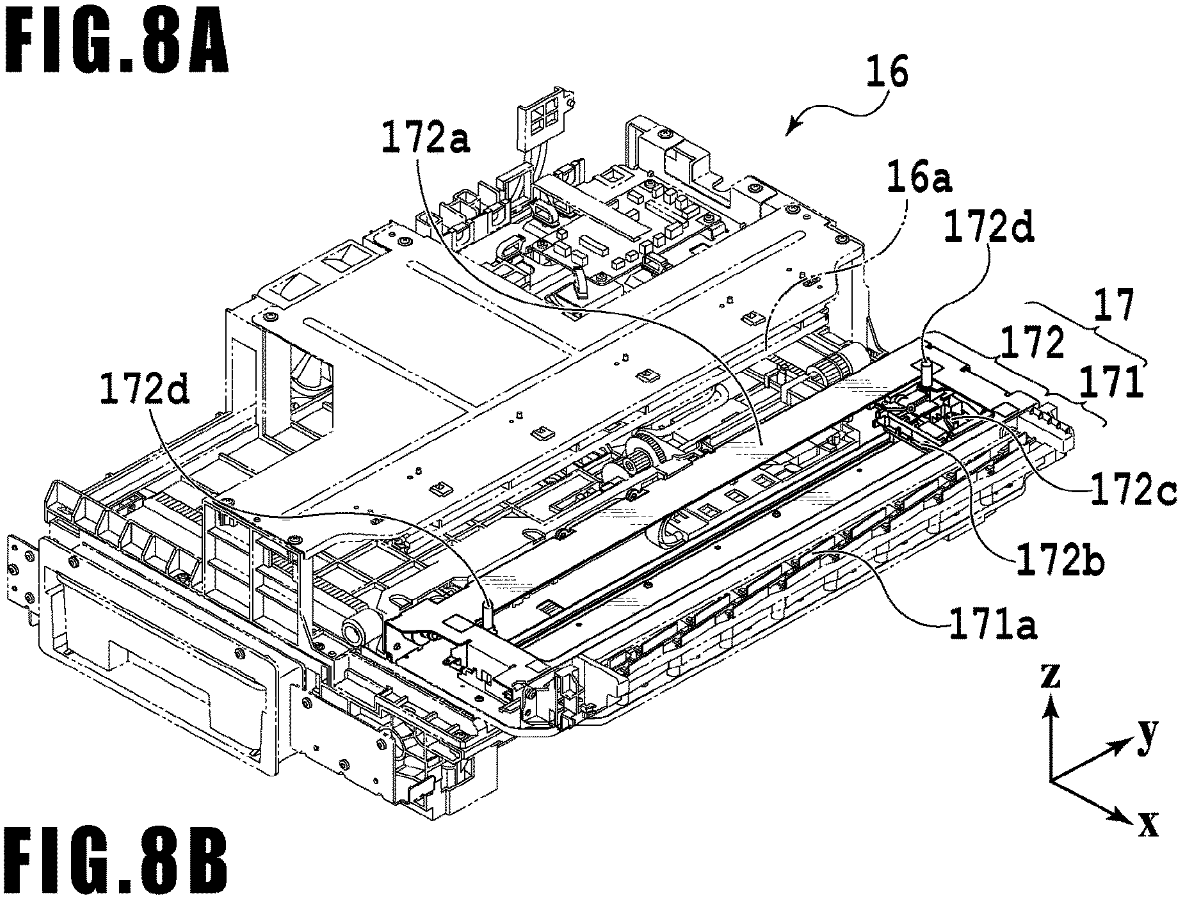

FIG. 8A is a perspective view showing the maintenance unit 16 in a standby position. FIG. 8B is a perspective view showing the maintenance unit 16 in a maintenance position. FIG. 8A corresponds to FIG. 1 and FIG. 8B corresponds to FIG. 7. In a case where the print head 8 is in the standby position, the maintenance unit 16 is in the standby position shown in FIG. 8A, the cap unit 10 has been moved vertically upward, and the wiping unit 17 is housed in the maintenance unit 16. The cap unit 10 comprises a box-shaped cap member 10*a* extending in the y-direction. The cap member 10*a* can be brought into intimate contact with the ejection opening surface 8*a* of the print head 8 to prevent ink from evaporating from the ejection openings. The cap unit 10 also has the function of collecting ink ejected to the cap member 10*a* for preliminary ejection or the like and allowing a suction pump (not shown) to suck the collected ink.

On the other hand, in the maintenance position shown in FIG. 8B, the cap unit 10 has been moved vertically downward and the wiping unit 17 has been drawn from the maintenance unit 16. The wiping unit 17 comprises two wiper units (wiping members): a blade wiper unit 171 and a vacuum wiper unit 172.

In the blade wiper unit 171, blade wipers 171*a* for wiping the ejection opening surface 8*a* in the x-direction are provided in the y-direction by the length of an area where the ejection openings are arrayed. In the case of performing wiping operation by the use of the blade wiper unit 171, the wiping unit 17 moves the blade wiper unit 171 in the x-direction while the print head 8 is positioned at a height at which the print head 8 can be in contact with the blade wipers 171*a*. This movement enables the blade wipers 171*a* to wipe ink and the like adhering to the ejection opening surface 8*a*.

The entrance of the maintenance unit 16 through which the blade wipers 171*a* are housed is equipped with a wet wiper cleaner 16*a* for removing ink adhering to the blade wipers 171*a* and applying a wetting liquid to the blade wipers 171*a*. The wet wiper cleaner 16*a* removes substances adhering to the blade wipers 171*a* and applies the wetting liquid to the blade wipers 171*a* each time the blade wipers 171*a* are inserted into the maintenance unit 16. The wetting liquid is transferred to the ejection opening surface 8*a* in the next wiping operation for the ejection opening surface 8*a*, thereby facilitating sliding between the ejection opening surface 8*a* and the blade wipers 171*a*.

The vacuum wiper unit 172 comprises a flat plate 172*a* having an opening extending in the y-direction, a carriage 172*b* movable in the y-direction within the opening, and a vacuum wiper 172*c* mounted on the carriage 172*b*. The vacuum wiper 172*c* is provided to wipe the ejection opening surface 8*a* in the y-direction along with the movement of the carriage 172*b*. The tip of the vacuum wiper 172*c* has a suction opening connected to the suction pump (not shown). Accordingly, if the carriage 172*b* is moved in the y-direction while operating the suction pump, ink and the like adhering to the ejection opening surface 8*a* of the print head 8 are wiped and gathered by the vacuum wiper 172*c* and sucked into the suction opening. At this time, the flat plate 172*a* and a dowel pin 172*d* provided at both ends of the opening are used to align the ejection opening surface 8*a* with the vacuum wiper 172*c*.

In the present embodiment, it is possible to carry out a first wiping process in which the blade wiper unit 171 performs wiping operation and the vacuum wiper unit 172 does not perform wiping operation and a second wiping process in which both the wiper units sequentially perform wiping operation. In the case of the first wiping process, the print controller 202 first draws the wiping unit 17 from the maintenance unit 16 while the print head 8 is evacuated vertically above the maintenance position shown in FIG. 7. The print controller 202 moves the print head 8 vertically downward to a position where the print head 8 can be in contact with the blade wipers 171*a* and then moves the wiping unit 17 into the maintenance unit 16. This movement enables the blade wipers 171*a* to wipe ink and the like adhering to the ejection opening surface 8*a*. That is, the blade wipers 171*a* wipe the ejection opening surface 8*a* at the time of moving from a position drawn from the maintenance unit 16 into the maintenance unit 16.

After the blade wiper unit 171 is housed, the print controller 202 moves the cap unit 10 vertically upward and brings the cap member 10*a* into intimate contact with the ejection opening surface 8*a* of the print head 8. In this state, the print controller 202 drives the print head 8 to perform preliminary ejection and allows the suction pump to suck ink collected in the cap member 10*a*.

In the case of the second wiping process, the print controller 202 first slides the wiping unit 17 to draw it from the maintenance unit 16 while the print head 8 is evacuated vertically above the maintenance position shown in FIG. 7. The print controller 202 moves the print head 8 vertically downward to the position where the print head 8 can be in contact with the blade wipers 171*a* and then moves the wiping unit 17 into the maintenance unit 16. This movement enables the blade wipers 171*a* to perform wiping operation for the ejection opening surface 8*a*. Next, the print controller 202 slides the wiping unit 17 to draw it from the maintenance unit 16 to a predetermined position while the print head 8 is evacuated again vertically above the maintenance position shown in FIG. 7. Then, the print controller 202 uses the flat plate 172*a* and the dowel pins 172*d* to align the ejection opening surface 8*a* with the vacuum wiper unit 172 while moving the print head 8 down to a wiping position shown in FIG. 7. After that, the print controller 202 allows the vacuum wiper unit 172 to perform the wiping operation described above. After evacuating the print head 8 vertically upward and housing the wiping unit 17, the print controller 202 allows the cap unit 10 to perform preliminary ejection into the cap member and suction operation of collected ink in the same manner as the first wiping process.

(Ink Supply Unit (Ink Circulation System))

Figure 9:
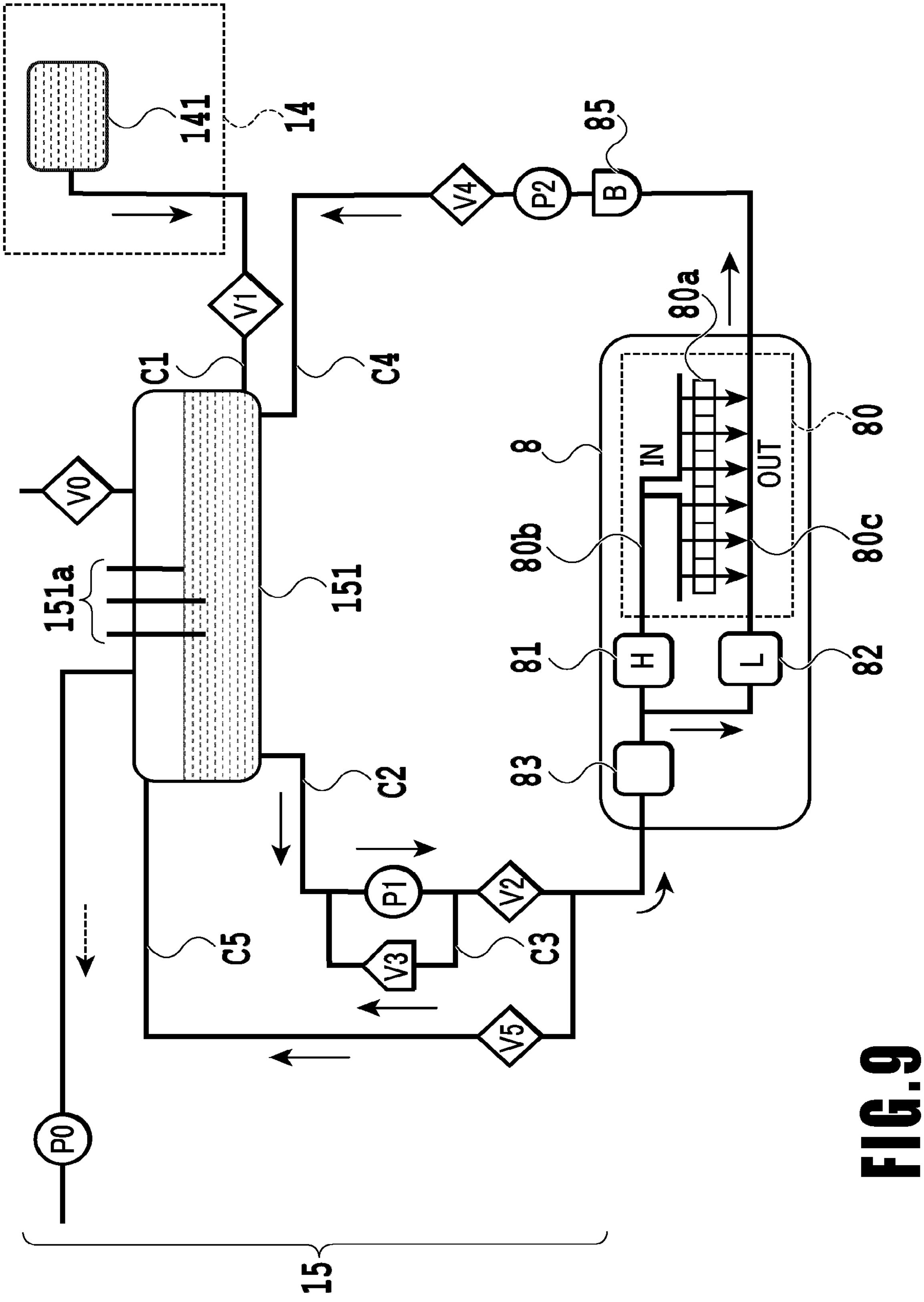
FIG. 9 is a diagram illustrating a flow path configuration of an ink circulation system.

FIG. 9 is a diagram including the ink supply unit 15 adopted in the inkjet printing apparatus 1 of the present embodiment. With reference of FIG. 9, a flow path configuration of an ink circulation system of the present embodiment will be described. The ink supply unit 15 is a configuration of supplying ink from the ink tank unit 14 to the print head 8. In the diagram, a configuration of one color ink is shown, but such a configuration is practically prepared for each color ink. The ink supply unit 15 is basically controlled by the ink supply control unit 209 shown in FIG. 2. Each configuration of the unit will be described below.

Ink is circulated mainly between a sub-tank 151 and the print head 8 (a head unit in FIG. 9). In the head unit 8, ink ejection operation is performed based on image data and ink that has not been ejected is collected and flows back to the sub-tank 151.

The sub-tank 151 in which a certain amount of ink is contained is connected to a supply flow path C2 for supplying ink to the head unit 8 and to a collection flow path C4 for collecting ink from the head unit 8. In other words, a circulation path for circulating ink is composed of the sub-tank 151, the supply flow path C2, the head unit 8, and the collection flow path C4.

In the sub-tank 151, a liquid level detection unit 151*a* composed of a plurality of pins is provided. The ink supply control unit 209 detects presence/absence of a conducting current between those pins so as to grasp a height of an ink liquid level, that is, an amount of remaining ink inside the sub-tank 151. A vacuum pump P0 is a negative pressure generating source for reducing pressure inside the sub-tank 151. An atmosphere release valve V0 is a valve for switching between whether or not to make the inside of the sub-tank 151 communicate with atmosphere.

A main tank 141 is a tank that contains ink which is to be supplied to the sub-tank 151. The main tank 141 is made of a flexible member, and the volume change of the flexible member allows filling the sub-tank 151 with ink. The main tank 141 has a configuration removable from the printing apparatus body. In the midstream of a tank connection flow path C1 connecting the sub-tank 151 and the main tank 141, a tank supply valve V1 for switching connection between the sub-tank 151 and the main tank 141 is provided.

Under the above configuration, once the liquid level detection unit 151*a* detects that ink inside the sub-tank 151 is less than the certain amount, the ink supply control unit 209 closes the atmosphere release valve V0, a supply valve V2, a collection valve V4, and a head replacement valve V5 and opens the tank supply valve V1. In this state, the ink supply control unit 209 causes the vacuum pump P0 to operate. Then, the inside of the sub-tank 151 is to have a negative pressure and ink is supplied from the main tank 141 to the sub-tank 151. Once the liquid level detection unit 151*a* detects that the amount of ink inside the sub-tank 151 is more than the certain amount, the ink supply control unit 209 closes the tank supply valve V1 to stop the vacuum pump P0.

The supply flow path C2 is a flow path for supplying ink from the sub-tank 151 to the head unit 8, and a supply pump P1 and the supply valve V2 are arranged in the midstream of the supply flow path C2. During print operation, driving the supply pump P1 in the state of the supply valve V2 being open allows ink circulation in the circulation path while supplying ink to the head unit 8. The amount of ink to be ejected per unit time by the head unit 8 varies according to image data. A flow rate of the supply pump P1 is determined so as to be adaptable even in a case where the head unit 8 performs ejection operation in which ink consumption amount per unit time becomes maximum.

A relief flow path C3 is a flow path which is located in the upstream of the supply valve V2 and which connects between the upstream and downstream of the supply pump P1. In the midstream of the relief flow path C3, a relief valve V3 which is a differential pressure valve is provided. In a case where an amount of ink supply from the supply pump P1 per unit time is larger than the total value of an ejection amount of the head unit 8 per unit time and a flow rate (ink drawing amount) in a collection pump P2 per unit time, the relief valve V3 is released according to a pressure applied to its own. As a result, a cyclic flow path composed of a portion of the supply flow path C2 and the relief flow path C3 is formed. By providing the configuration of the above relief flow path C3, the amount of ink supply to the head unit 8 is adjusted according to the ink consumption amount by the head unit 8 so as to stabilize a pressure inside the circulation path irrespective of image data.

The collection flow path C4 is a flow path for collecting ink from the head unit 8, back to the sub-tank 151. In the midstream of the collection flow path C4, the collection pump P2 and the collection valve V4 are provided, and further, a buffer chamber 85 is provided. The buffer chamber 85 will be described later. At the time of ink circulation within the circulation path, the collection pump P2 sucks ink from the head unit 8 by serving as a negative pressure generating source. By driving the collection pump P2, an appropriate differential pressure is generated between an IN flow path 80*b* and an OUT flow path 80*c* inside the head unit 8, thereby causing ink to circulate between the IN flow path 80*b* and the OUT flow path 80*c*. A flow path configuration inside the head unit 8 will be described later in detail.

The collection valve V4 is a valve for preventing a backflow at the time of not performing print operation, that is, at the time of not circulating ink within the circulation path. In the circulation path of the present embodiment, the sub-tank 151 is disposed higher than the head unit 8 in a vertical direction (see FIG. 1). For this reason, in a case where the supply pump P1 and the collection pump P2 are not driven, there may be a possibility that ink flows back from the sub-tank 151 to the head unit 8 due to a water head difference between the sub-tank 151 and the head unit 8. In order to prevent such a backflow, the present embodiment provides the collection valve V4 in the collection flow path C4.

Similarly, at the time of not performing print operation, that is, at the time of not circulating ink within the circulation path, the supply valve V2 also functions as a valve for preventing ink supply from the sub-tank 151 to the head unit 8.

A head replacement flow path C5 is a flow path connecting the supply flow path C2 and an air layer (a part in which ink is not contained) of the sub-tank 151, and in its midstream, the head replacement valve V5 is provided. One end of the head replacement flow path C5 is connected to the upstream of the head unit 8 in the supply flow path C2 and the other end is connected to the upper part of the sub-tank 151 and is communicated with the air layer inside the sub-tank 151. The head replacement flow path C5 is used in the case of collecting ink from the head unit 8 in use such as upon replacing the head unit 8 or transporting the printing apparatus 1. The head replacement valve V5 is controlled by the ink supply control unit 209 so as to be closed except for a case of initial ink filling in the printing apparatus 1 and a case of collecting ink from the head unit 8. In addition, the above-described supply valve V2 is provided, in the supply flow path C2, between a connection point to the head replacement flow path C5 and a connection point to the relief flow path C3.

Next, a flow path configuration inside the head unit 8 will be described. Ink supplied from the supply flow path C2 to the head unit 8 passes through a filter 83 and then is supplied to a first negative pressure control unit 81 and a second negative pressure control unit 82. The first negative pressure control unit 81 is set to have a control pressure of a low negative pressure. The second negative pressure control unit 82 is set to have a control pressure of a high negative pressure. Pressures in those first negative pressure control unit 81 and second negative pressure control unit 82 are generated within a proper range by the driving of the collection pump P2.

In an ink ejection unit 80, a printing element substrate 80*a* in which a plurality of ejection openings are arrayed is arranged in plural to form an elongate ejection opening array. A common supply flow path 80*b* (IN flow path) for guiding ink supplied from the first negative pressure control unit 81 and a common collection flow path 80*c* (OUT flow path) for guiding ink supplied from the second negative pressure control unit 82 also extend in an arranging direction of the printing element substrates 80*a*. Furthermore, in the individual printing element substrates 80*a*, individual supply flow paths connected to the common supply flow path 80*b* and individual collection flow paths connected to the common collection flow path 80*c* are formed. Accordingly, in each of the printing element substrates 80*a*, an ink flow is generated such that ink flows in from the common supply flow path 80*b* which has relatively lower negative pressure and flows out to the common collection flow path 80*c* which has relatively higher negative pressure. In the midstream of a path between the individual supply flow path and the individual collection flow path, a pressure chamber which is communicated with each ejection opening and which is filled with ink is provided. An ink flow is generated in the ejection opening and the pressure chamber even in a case where printing is not performed. Once the ejection operation is performed in the printing element substrate 80*a*, a part of ink moving from the common supply flow path 80*b* to the common collection flow path 80*c* is ejected from the ejection opening and is consumed. Meanwhile, ink not having been ejected moves toward the collection flow path C4 via the common collection flow path 80*c*.

Figure 10A:
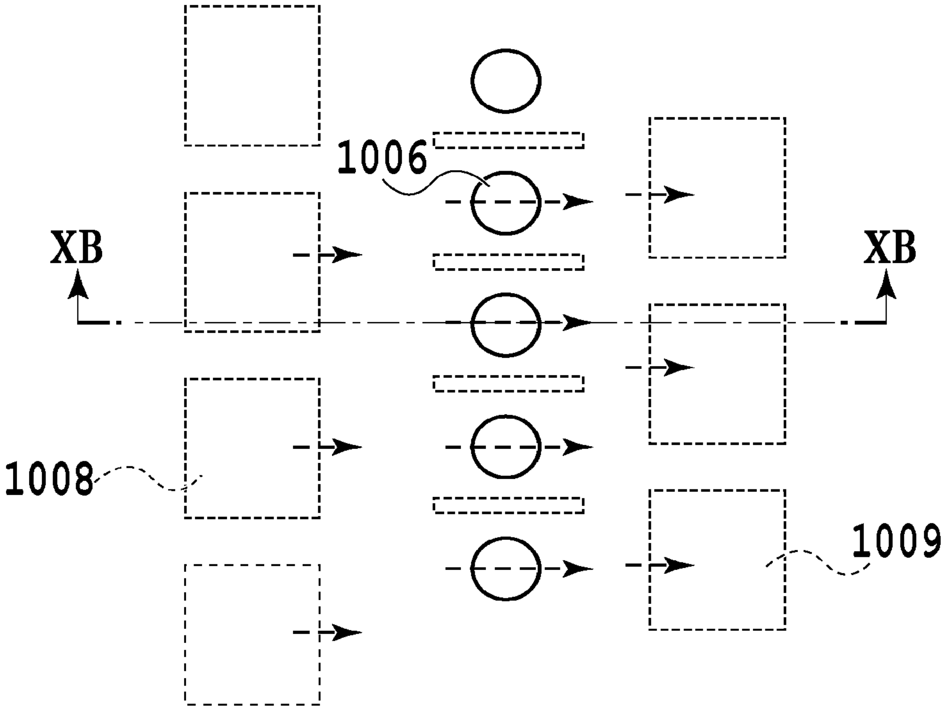
FIGS. 10A and 10B are diagrams illustrating an ejection opening and a pressure chamber.
Figure 10B:
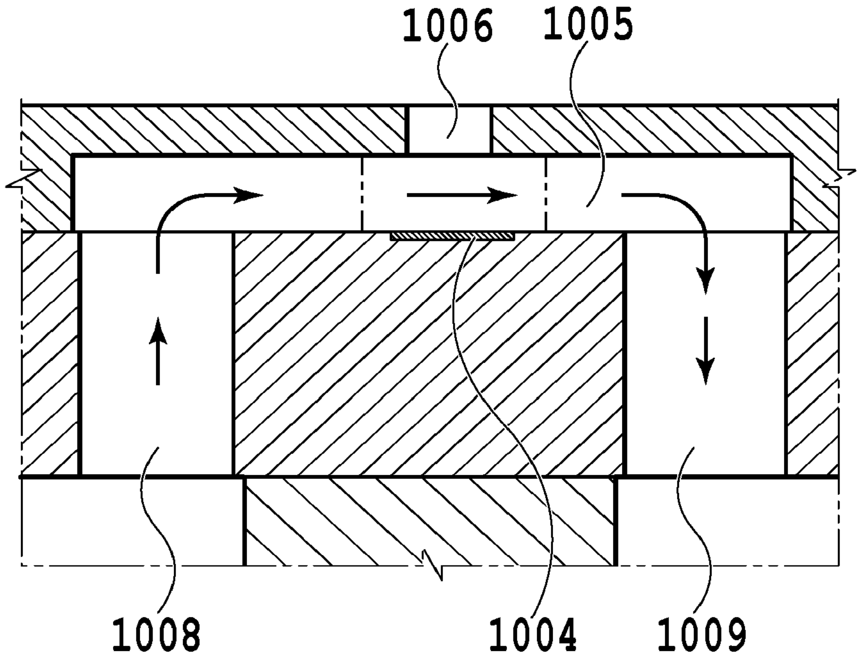

FIG. 10A is a plan schematic view enlarging a part of the printing element substrate 80*a*, and FIG. 10B is a sectional schematic view of a cross section taken from line XB-XB of FIG. 10A. In the printing element substrate 80*a*, a pressure chamber 1005 which is filled with ink and an ejection opening 1006 from which ink is ejected are provided. In the pressure chamber 1005, a printing element 1004 is provided at a position facing the ejection opening 1006. Further, in the printing element substrate 80*a*, a plurality of ejection openings 1006 are formed, each of which is connected to an individual supply flow path 1008 which is connected to the common supply flow path 80*b* and an individual collection flow path 1009 which is connected to the common collection flow path 80*c*.

According to the above configuration, in the printing element substrate 80*a*, an ink flow is generated such that ink flows in from the common supply flow path 80*b* which has relatively lower negative pressure (high pressure) and flows out to the common collection flow path 80*c* which has relatively higher negative pressure (low pressure). To be more specific, ink flows in the order of the common supply flow path 80*b*, the individual supply flow path 1008, the pressure chamber 1005, the individual collection flow path 1009, and the common collection flow path 80*c*. Once ink is ejected by the printing element 1004, part of ink moving from the common supply flow path 80*b* to the common collection flow path 80*c* is ejected from the ejection opening 1006 to be discharged outside the head unit 8. Meanwhile, ink not having been ejected from the ejection opening 1006 is collected and flows into the collection flow path C4 via the common collection flow path 80*c*.

Figure 11A:
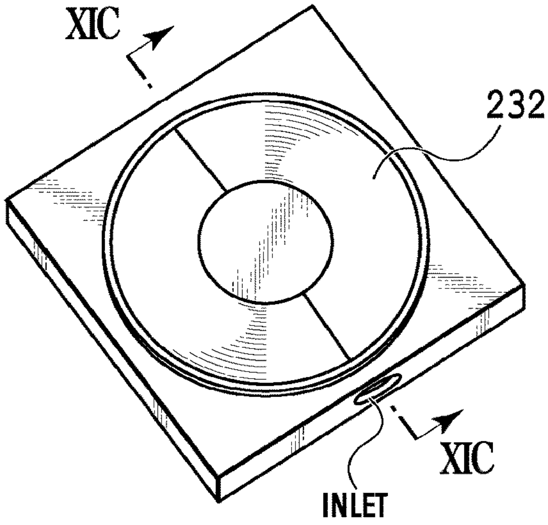
FIGS. 11A to 11C are diagrams illustrating a negative pressure control unit.
Figure 11B:
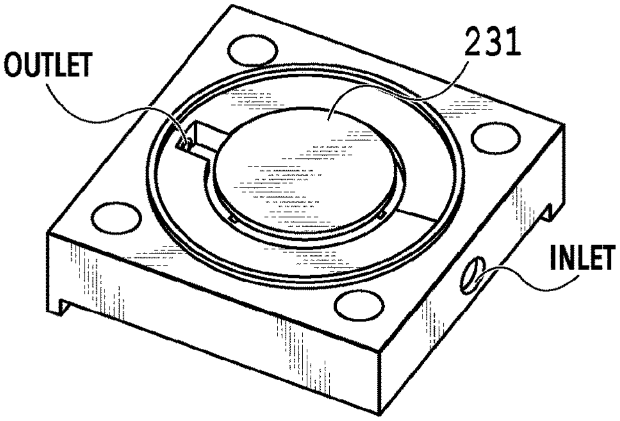
Figure 11C:
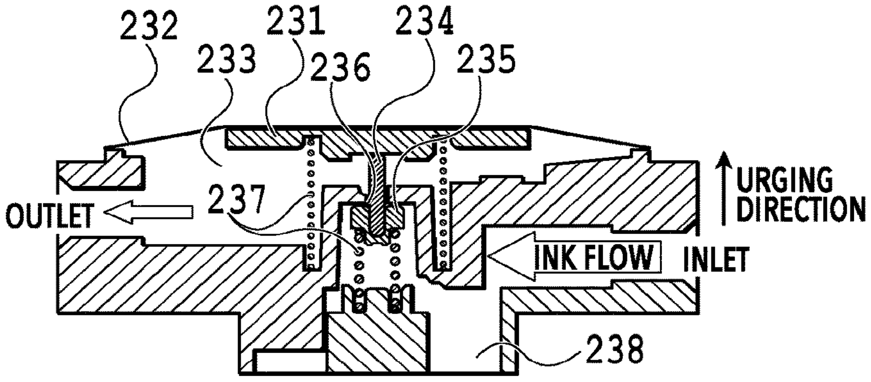

FIG. 11A to FIG. 11C show the first negative pressure control unit 81 provided in the head unit 8. FIG. 11A and FIG. 11B are appearance perspective views, and in particular, FIG. 11B shows inside the first negative pressure control unit 81 in the state where a flexible film 232 is not shown. FIG. 11C is a cross section taken from line XIC-XIC of FIG. 11A. The first negative pressure control unit 81 and the second negative pressure control unit 82 are differential pressure valves and have the same structure other than a difference in control pressures (the initial load of a spring), and therefore, a description on the second negative pressure control unit 82 will be omitted.

The first negative pressure control unit 81 is composed of the pressure receiving plate 231 shown in FIG. 11B and the flexible film 232 sealing an ambient air space so as to form a first pressure chamber 233 inside the first negative pressure control unit 81. The flexible film 232 is welded on an edge of a circular shape and on the pressure receiving plate 231 as shown in FIG. 11B. In accordance with the increase/decrease of ink inside the first pressure chamber 233, the flexible film 232 and the pressure receiving plate 231 on which the flexible film 232 is welded are displaced vertically.

In the upstream of the first pressure chamber 233 in an ink supplying direction, a second pressure chamber 238 connected to the supply pump P1, a shaft 234 coupled to the pressure receiving plate 231, a valve 235 coupled to the shaft 234, and an orifice 236 which abuts the valve 235 are provided. The orifice 236 of the present embodiment is provided at a boundary between the first pressure chamber 233 and the second pressure chamber 238. The valve 235, the shaft 234, and the pressure receiving plate 231 are further urged in the vertically upward direction by using an urging member (spring) 237.

In a case where an absolute value of a pressure inside the first pressure chamber 233 is equal to or more than a first threshold value (a case where a negative pressure is lower than the first threshold value), the valve 235 abuts the orifice 236 as a result of an urging force of the urging member 237 to interrupt the connection between the first pressure chamber 233 and the second pressure chamber 238. On the other hand, in a case where an absolute value of a pressure inside the first pressure chamber 233 is less than the first threshold value, that is, a negative pressure higher than the first threshold value is applied to the first pressure chamber 233, the flexible film 232 is contracted to be displaced downward. Accordingly, the pressure receiving plate 231 and the valve 235 are displaced downward against the urging force of the urging member 237, and the valve 235 and the orifice 236 are separated so that the first pressure chamber 233 and the second pressure chamber 238 are connected to each other. As a result of this connection, ink supplied by the supply pump P1 flows toward the first pressure chamber 233.

The first negative pressure control unit 81 has the configuration of the above-described differential pressure valve, and thus controls an inflow pressure and an outflow pressure to be constant. The second negative pressure control unit 82 uses the urging member 237 having a larger urging force than that of the first negative pressure control unit 81 so as to generate a higher negative pressure than that in the first negative pressure control unit 81. In other words, in the second negative pressure control unit 82, the valve is released in a case where an absolute value of the pressure of the unit becomes less than a second threshold, which is smaller than the first threshold value. Therefore, once the driving of the collection pump P2 starts, the first negative pressure control unit 81 is firstly released and then the second negative pressure control unit 82 is released.

Under the above configuration, in performing print operation, the ink supply control unit 209 closes the tank supply valve V1 and the head replacement valve V5 and opens the atmosphere release valve V0, the supply valve V2, and the collection valve V4 to drive the supply pump P1 and the collection pump P2. As a result, the circulation path in the order of the sub-tank 151, the supply flow path C2, the head unit 8, the collection flow path C4, and the sub-tank 151 is established. In a case where an amount of ink supply from the supply pump P1 per unit time is larger than the total value of an ejecting amount of the head unit 8 per unit time and a flow rate in the collection pump P2 per unit time, ink flows from the supply flow path C2 into the relief flow path C3. As a result, the flow rate of ink from the supply flow path C2 to the head unit 8 is adjusted.

In the case of not performing print operation, the ink supply control unit 209 stops the supply pump P1 and the collection pump P2 and closes the atmosphere release valve V0, the supply valve V2, and the collection valve V4. As a result, the ink flow inside the head unit 8 stops and the backflow caused by the water head difference between the sub-tank 151 and the head unit 8 is suppressed. Further, by closing the atmosphere release valve V0, ink leakage and ink evaporation from the sub-tank 151 are suppressed.

In the case of collecting ink from the head unit 8, the ink supply control unit 209 closes the atmosphere release valve V0, the tank supply valve V1, the supply valve V2, and the collection valve V4 and opens the head replacement valve V5 to drive the vacuum pump P0. As a result, the inside of the sub-tank 151 becomes in a negative pressure state, and ink inside the head unit 8 is collected to the sub-tank 151 via the head replacement flow path C5. As such, the head replacement valve V5 is a valve being closed during normal print operation or at the time of standby and being open upon collecting ink from the head unit 8. In addition, the head replacement valve V5 is released even at the time of filling the head replacement flow path C5 with ink for an initial ink filling to the head unit 8.

(Buffer Chamber)

Next, in the ink circulation system illustrated in FIG. 9, the buffer chamber 85 (denoted as "B" in FIG. 9) disposed in the collection flow path C4 will be described.

In the ink circulation system, it is ideal to circulate ink in a state where air in the circulation path is completely discharged. However, in a practical case, a small amount of bubbles (air) reside in the head unit 8 and in the flow path. Such bubbles may expand or shrink depending on an environmental change (for example, a temperature change). Due to the expansion or shrinkage of bubbles, a pressure applied to the ejection opening may change so as to cause ink leakage or the drawing of atmosphere. For instance, there may be a case where, upon a temperature drop, a bubble shrinks and a negative pressure at the ejection opening becomes high, thereby inducing meniscus breakage at the ejection opening to absorb atmosphere into the head unit. In contrast, there may be a case where, upon a temperature rise, a bubble expands and ink leaks out from the ejection opening. The buffer chamber 85 absorbs such bubble expansion and shrinkage.

Figure 12A:
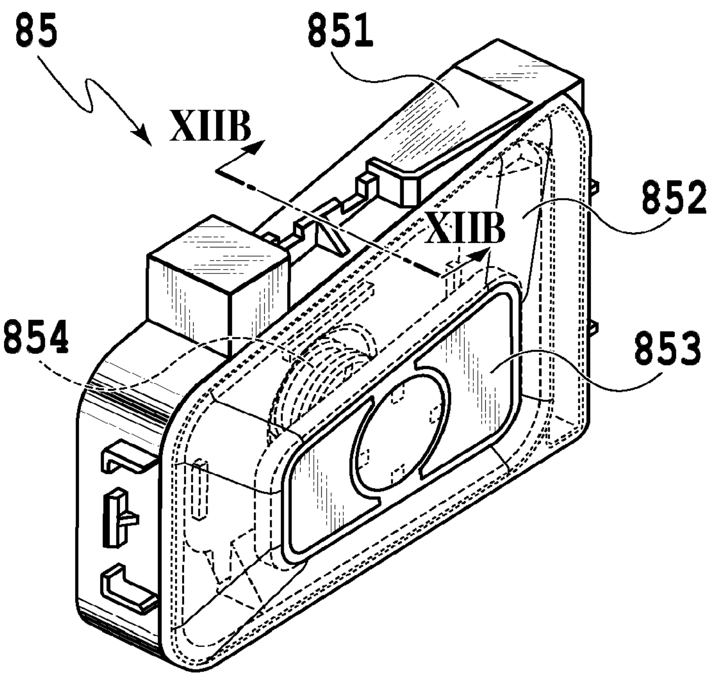
FIGS. 12A and 12B are diagrams showing one example of a buffer chamber.
Figure 12B:
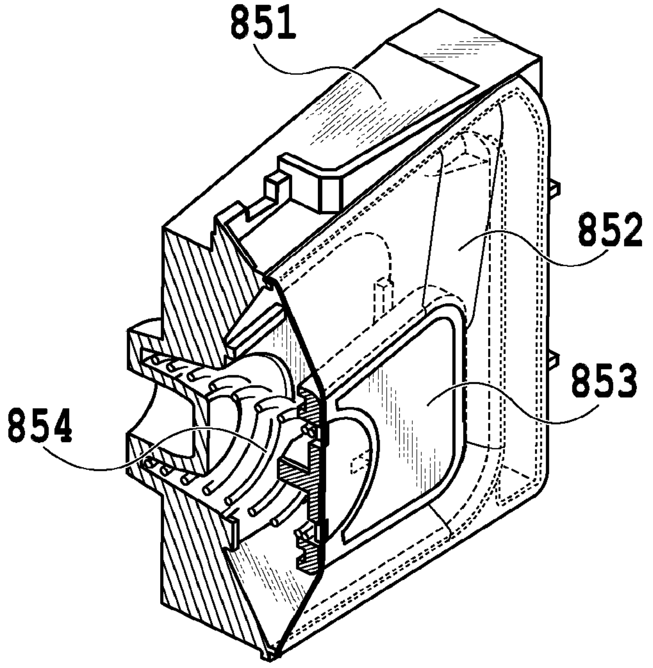

FIG. 12A and FIG. 12B are diagrams showing one example of the buffer chamber 85. FIG. 12A shows a perspective view of the buffer chamber 85 and FIG. 12B shows a perspective view including a cross section taken from line XIIB-XIIB The buffer chamber 85 includes a frame 851, a film 852, a pressure receiving plate 853, and a compression spring 854. The frame 851 has an opening on a first face, and the film 852 is stretched so as to cover the first face. The film 852 is a flexible member and adheres to the pressure receiving plate 853. The pressure receiving plate 853 is connected to the compression spring 854. Due to such a configuration, a position of the pressure receiving plate 853 is movable according to the expansion or contraction of the compression spring 854. The film 852 is expanded or contracted according to a position of the pressure receiving plate 853. Hereinafter, the film 852 being expanded (or contracted) as described above is referred to as the buffer chamber 85 being expanded (or the buffer chamber 85 being contracted). By providing the buffer chamber 85 as such, in a case where bubbles expand or shrink according to temperature changes and the like in the state where ink is not circulated, the buffer chamber 85 is expanded or contracted as a result of the volume changes of the bubbles in the flow path. Such an effect of the buffer chamber 85 allows absorbing a volume of the expansion or shrinkage of the bubbles. Therefore, the leakage of ink or the suction of atmosphere described above can be prevented.

The first negative pressure control unit 81 and the second negative pressure control unit 82 include pressure adjusting valves, respectively. In the state where ink is not circulated, that is, the state where a negative pressure is not generated, the pressure adjusting valves of the first negative pressure control unit 81 and the second negative pressure control unit 82 are in a closed state so as to shut off the upstream of the supply flow path. Therefore, in the example of FIG. 9, the buffer chamber 85 is disposed in a flow path in which the bubble expansion or shrinkage may possibly influence the ejection opening of the head unit 8 in the case where ink is not circulated, namely, the collection flow path C4.

Incidentally, in the buffer chamber 85, an inflow opening into which ink flows is provided at one end side (the front side of FIG. 12A) in a longitudinal direction, and an outflow opening from which ink flows is provided at the other end side (the back side of FIG. 12A). The height of a ceiling located at an upper part of the buffer chamber 85 in a vertical direction is configured to be gradually increased along a direction from the inflow opening toward the outflow opening.

(Cause of Longer FPOT)

The cause of taking longer FPOT in the case of using the ink circulation system that provides the buffer chamber 85 as described above will be explained. As shown in FIG. 9, the buffer chamber 85 is disposed upstream (head unit 8 side) of the collection pump P2 in the collection flow path C4. Upon the start of ink circulation, the collection pump P2 becomes a negative pressure generating source, as described above, to suck ink from the head unit 8. More specifically, once a negative pressure applied inside the head unit 8 becomes stable, the pressure adjusting valves of the first negative pressure control unit 81 and the second negative pressure control unit 82 become open and a predetermined differential pressure inside the head unit 8 causes a flow from the IN flow path to the OUT flow path so as to start ink circulation. Here, the buffer chamber 85 has a configuration of a spring bag as described above, and if a negative pressure is generated by the collection pump P2, the contraction starts such that a film part starts to crush. In an initial stage of such negative pressure generation, a pressure change has an effect on the buffer chamber 85 which is close to the negative pressure generating source, and thus, in order to stabilize the negative pressure in the head unit 8, the buffer chamber 85 should be completely contracted (or completely crushed) so as to further reach a predetermined pressure. As a result, an FPOT from the output of the printing instruction until the actual printing takes longer.

Figure 13A:
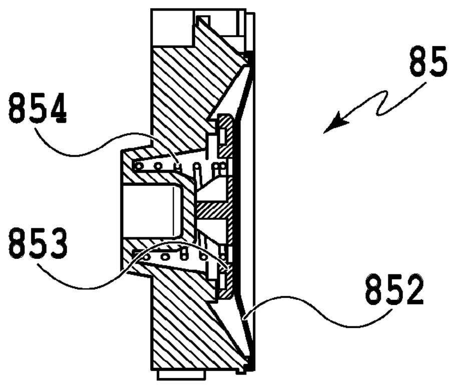
FIGS. 13A to 13D are diagrams showing cross sections of the buffer chamber.

FIG. 13A to FIG. 13D are diagrams showing cross sections taken from line XB-XB of the buffer chamber 85 of FIG. 12A. FIG. 13A shows a first state of the buffer chamber 85. The first state is a state where ink is circulated. In the case where ink is circulated, the buffer chamber 85 is kept in a completely contracted state due to a negative pressure generated by the collection pump P2.

Figure 13B:
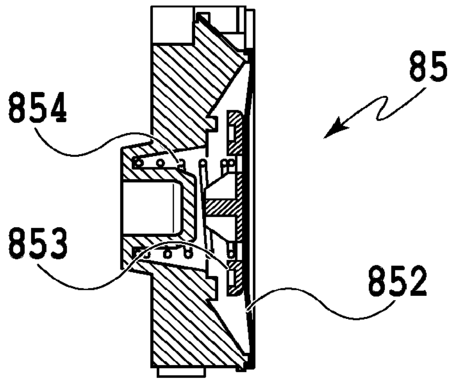
Figure 13C:
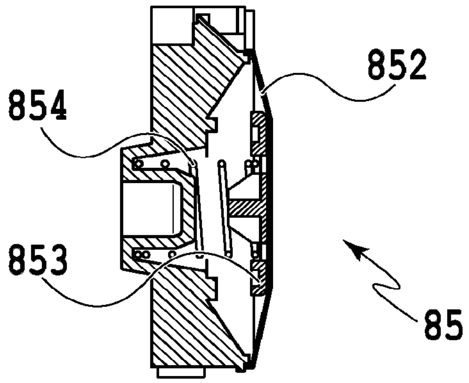
Figure 13D:
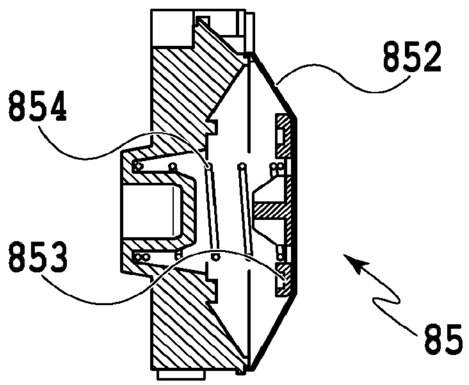

FIG. 13B to FIG. 13D show the states of the buffer chamber 85 in the case where ink circulation is stopped. Since the generated negative pressure no longer exists as a result of stopping the collection pump P2, all diagrams of FIG. 13B to FIG. 13D show the states where the buffer chamber 85 is expanded compared to the first state during the circulation in FIG. 13A. FIG. 13B shows a second state of the buffer chamber 85. The second state is a state where bubbles shrink due to environmental changes during the circulation stop. Even in a case where the buffer chamber 85 is contracted due to the bubble shrinkage, the buffer chamber 85 is in an expanded state compared to the first state during the circulation. FIG. 13C shows a third state of the buffer chamber 85. The third state is a state of a standby in which the environmental changes do not occur (no bubble shrinkage or expansion) during the circulation stop. The third state is a basic state during the circulation stop, and if the bubbles shrink in this state, the buffer chamber 85 is to be changed to the second state of FIG. 13B. FIG. 13D shows a fourth state of the buffer chamber 85. The fourth state is a state where the bubbles expand due to the environmental changes during the circulation stop. The fourth state is a state where the buffer chamber 85 is further expanded compared to the third state. In comparison with FIG. 13A to FIG. 13D, the first state of the buffer chamber 85 during the ink circulation is in a state where the buffer chamber 85 is contracted more than any of the second to fourth states during the ink circulation stop. In other words, in a case of starting ink circulation from the state of the ink circulation stop, a time period from each of the states shown in FIG. 13B to FIG. 13D until the contraction of the buffer chamber 85 as in the first state shown in FIG. 13A will affect the FPOT. A configuration of reducing the FPOT will be described below.

(Pump Flow Rate Control)

Figure 14:
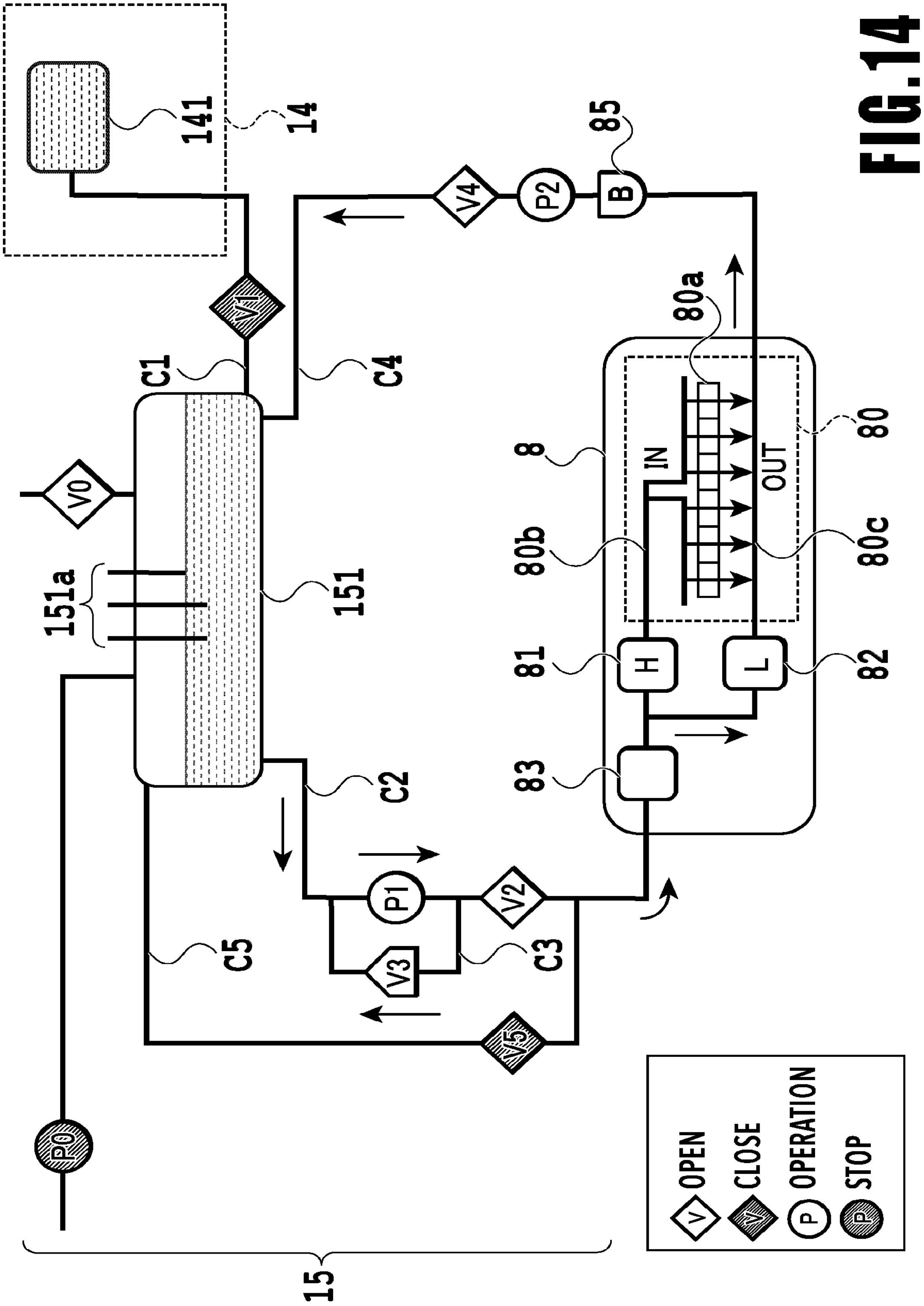
FIG. 14 is a diagram showing open/closed states of valves and driving states of pumps in a circulation flow path.

FIG. 14 is a diagram showing open/closed states of valves and driving states of pumps in a circulation flow path during ink circulation in the circulation system shown in FIG. 9. In a case where print operation is performed, ink circulation is made as shown in FIG. 14. During ink circulation, the tank supply valve V1 and the head replacement valve V5 are in a closed state. The vacuum pump P0 is in a stopped state. Meanwhile, the atmosphere release valve V0, the supply valve V2, and the collection valve V4 are in an open state. The supply pump P1 and the collection pump P2 are in an operating state. As such, during the ink circulation, the buffer chamber 85 is in the first state as shown in FIG. 13A. In other words, the buffer chamber 85 is in the completely contracted state due to the negative pressure.

Figure 15:
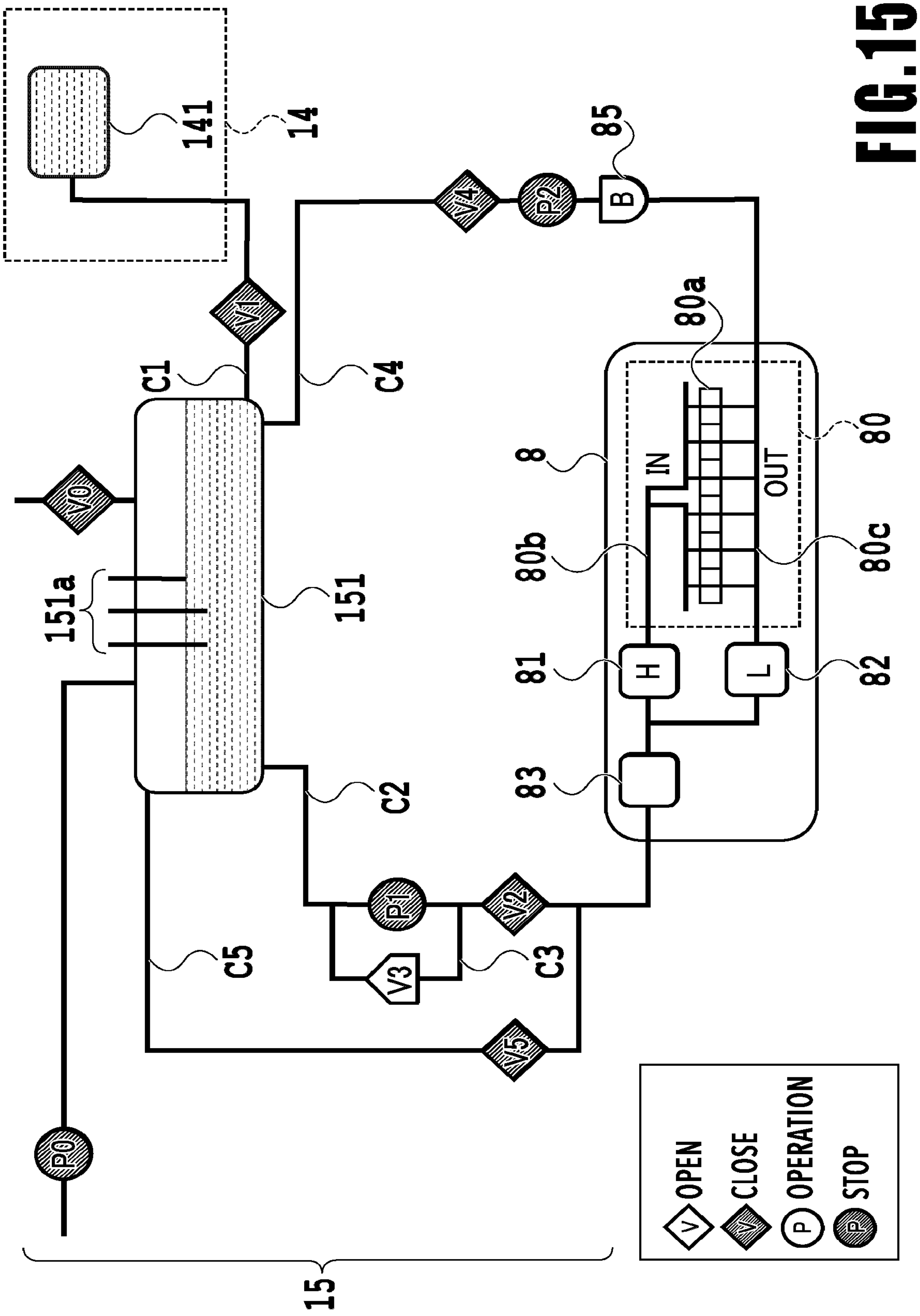
FIG. 15 is a diagram showing open/closed states of the valves and driving states of the pumps in the circulation flow path.

FIG. 15 is a diagram showing open/closed states of the valves and driving states of the pumps in the circulation flow path while the ink circulation is stopped in the circulation system shown in FIG. 9. In the case where the print operation is completed, the ink circulation is in a stopped state as shown in FIG. 15. The atmosphere release valve V0, the supply valve V2, and the collection valve V4 are in a closed state, which are different from those in the case of FIG. 14. In addition, the supply pump P1 and the collection pump P2 become in a stopped state. In this case, the buffer chamber 85 is in the third state at the time of standby as shown in FIG. 13C. This is because that, once the collection pump P2 stops operation, a part having been contracted starts to expand due to a pressure loss as a result of the stop of ink flow, or ink enters the buffer chamber 85 from its upstream side.

According to the present embodiment, in the case of starting ink circulation in response to a printing instruction from the state where circulation is stopped as shown in FIG. 15, a flow rate of the collection pump P2 is temporarily increased compared to a flow rate during the print operation. Accordingly, the buffer chamber 85 that has been expanded is caused to be promptly shifted to the completely contracted state (first state) as shown in FIG. 13A.

Incidentally, the collection pump P2 according to the present embodiment is set to have restrictions on flow rates. The lower limit of a flow rate is specified to be a value required to ensure a sufficient flow rate for ejection, that is, a value required to circulate ink within the head unit 8. Meanwhile, if the flow rate is too large, a pressure loss for the ejection opening becomes too large, thereby failing to perform ejection due to occurrence of meniscus breakage at the ejection opening. For this reason, the upper limit of a flow rate is also set to have a restriction. As such, the upper and lower restrictions on flow rates are provided and the collection pump P2 is drive-controlled within this range. As one of the examples, the collection pump P2 is drive-controlled so as to achieve the flow rate of 10 ml/min.

As such, the flow rate of the collection pump P2 is set to be restricted in consideration of ejection. However, since the buffer chamber 85 before the print operation is in the third state as shown in FIG. 13C and the flow rate of ink circulating within the head unit 8 is not stable until the buffer chamber 85 becomes in the completely contracted first state as shown in FIG. 13A, the above-described restriction of the flow rate is not required to be considered during such a period. Accordingly, in the present embodiment, the collection pump P2 is controlled to increase a flow rate at the time of the start of the ink circulation. For instance, the ink supply control unit 209 makes control to increase the driving amount (the number of revolution) of the collection pump P2 to a flow rate (second flow rate) of 30 ml/min, which is three times the flow rate (first flow rate) of 10 ml/min at the time of ink circulation in which print operation can be made. In other words, assuming that a revolution speed of the collection pump P2 at the time of the print operation is a first speed, the collection pump P2 is driven at a second speed which is faster than the first speed until the lapse of predetermined time period from the start of revolution. By increasing the flow rate, a high negative pressure can be applied to the upstream of the collection pump P2 including the head unit 8, and thus the buffer chamber 85 is promptly contracted. As a result, the FPOT can be reduced. A predetermined time period to increase the flow rate of the collection pump P2 should be set to, for example, a previously measured time period until the flow rate of ink flowing inside the head unit 8 and through the collection flow path C4 is stabilized. After a lapse of predetermined time period, the ink supply control unit 209 changes the driving amount of the collection pump P2 so as to bring it back to a normal flow rate of ink circulation.

Incidentally, in the above example, the form of making drive control so as to cause the collection pump P2 to have the second flow rate, which is three times the first flow rate during the ink circulation has been described as an example, but the present invention is not limited to this. The collection pump P2 may be drive-controlled, at the start of ink circulation, so as to have the second flow rate, which is larger than the first flow rate during the ink circulation. Increasing a flow rate to be larger than the first flow rate allows reducing the FPOT compared to the case of not making control as in the present embodiment. Further, the second flow rate may not necessarily be a fixed flow rate, but may be a variable flow rate within a range larger than the first flow rate.

In addition, in the present embodiment, control may be made by changing time period for driving the collection pump P2 in the second speed which is faster than the normal speed. For instance, in a case where standby time from the completion of print operation to the start of next print operation is long, ink may possibly adhere to the vicinity of the ink ejection opening 1006. In such a case, by setting longer time period for driving the collection pump P2 at the second speed, the ink adhered to the ink ejection opening 1006 can be sufficiently circulated so as to enable stable ink ejection. To be more specific, time period for driving the collection pump P2 at the second speed is changed according to the lapse of time from the completion of previous print operation.

Furthermore, in the present embodiment, ink circulation can be switched according to the print mode. In other words, in a monochrome mode, only black ink is to be circulated, whereas in a color mode, both the black ink and color ink are to be circulated. In a case where print operation in the monochrome mode is performed in succession, ink circulation for color ink will not be made for a long time and the color ink is likely to adhere to the vicinity of the ink ejection opening 1006. For this reason, in a case of performing print operation in the color mode after print operation is performed in the monochrome mode, time period for driving the collection pump P2 at the second speed is set to be longer.

(Flowchart)

Figure 16:
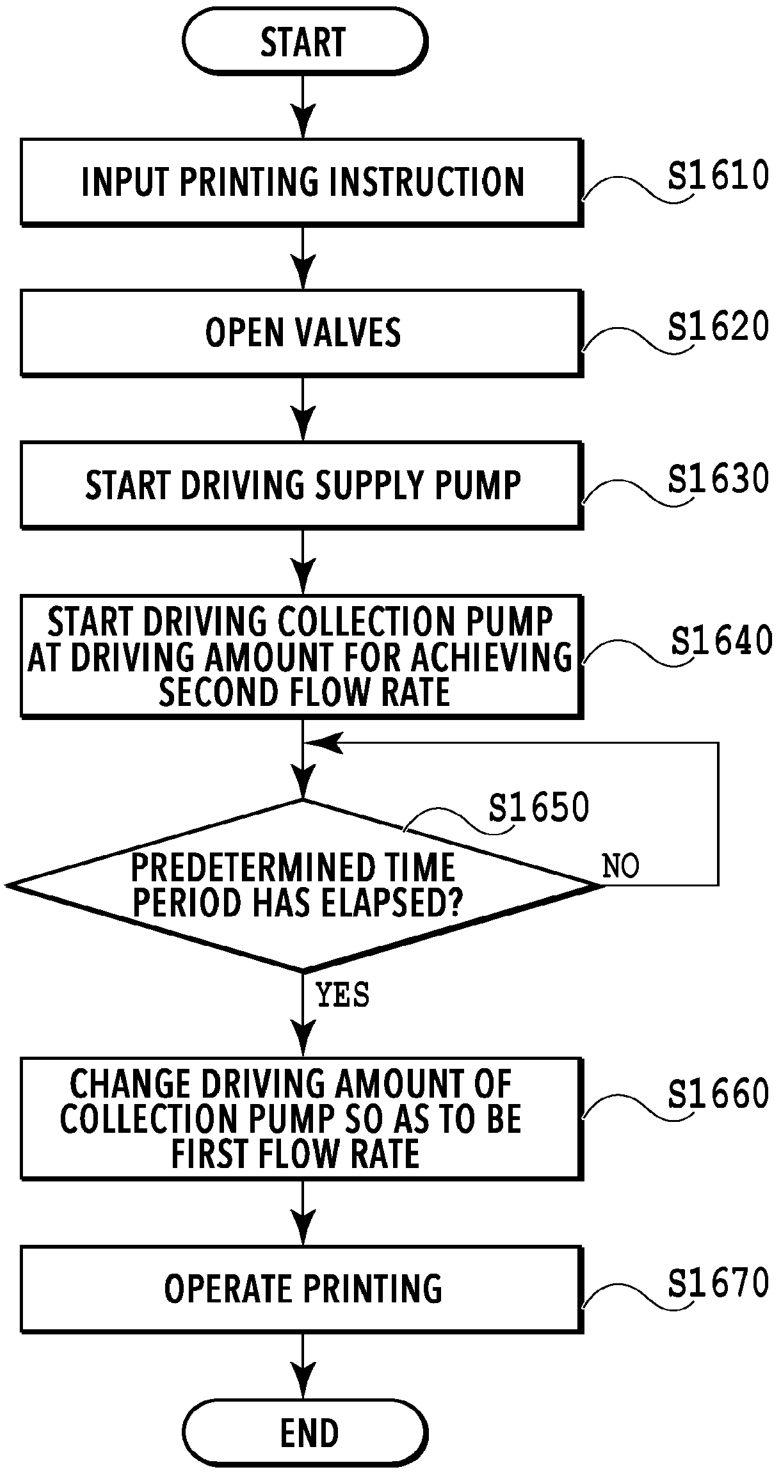
FIG. 16 is a diagram showing a flowchart.

FIG. 16 is a diagram showing a flowchart in the case of starting the ink circulation of the present embodiment. In Step S1610, a printing instruction is inputted in the print controller 202. Then, the print controller 202 instructs the ink supply control unit 209 to start circulation.

In Step S1620, the ink supply control unit 209 makes control to open the valves so as to be in the state shown in FIG. 14. More specifically, the ink supply control unit 209 controls the supply valve V2 and the collection valve V4 to open. In Step S1630, the ink supply control unit 209 starts driving the supply pump P1.

In Step S1640, the ink supply control unit 209 starts driving the collection pump P2 at the driving amount that achieves the second flow rate, which is larger than the flow rate (first flow rate) of the normal ink circulation. In Step S1650, in a case where a predetermined time period has elapsed after having waited for such a predetermined time period, the process advances to Step S1660. In Step S1660, the ink supply control unit 209 changes the driving amount of the collection pump P2 to be at the first flow rate. In Step S1670, the print controller 202 controls the head carriage control unit 208 to perform print operation.

As described above, in the present embodiment, the collection pump P2 is controlled, at the start of ink circulation, to increase its flow rate compared to that at the normal ink circulation for a predetermined time period. Accordingly, a time period required for the contraction of the buffer chamber 85 can be reduced, thereby reducing the FPOT.

Second Embodiment (Buffer Chamber Shutoff Valve)

Figure 17:
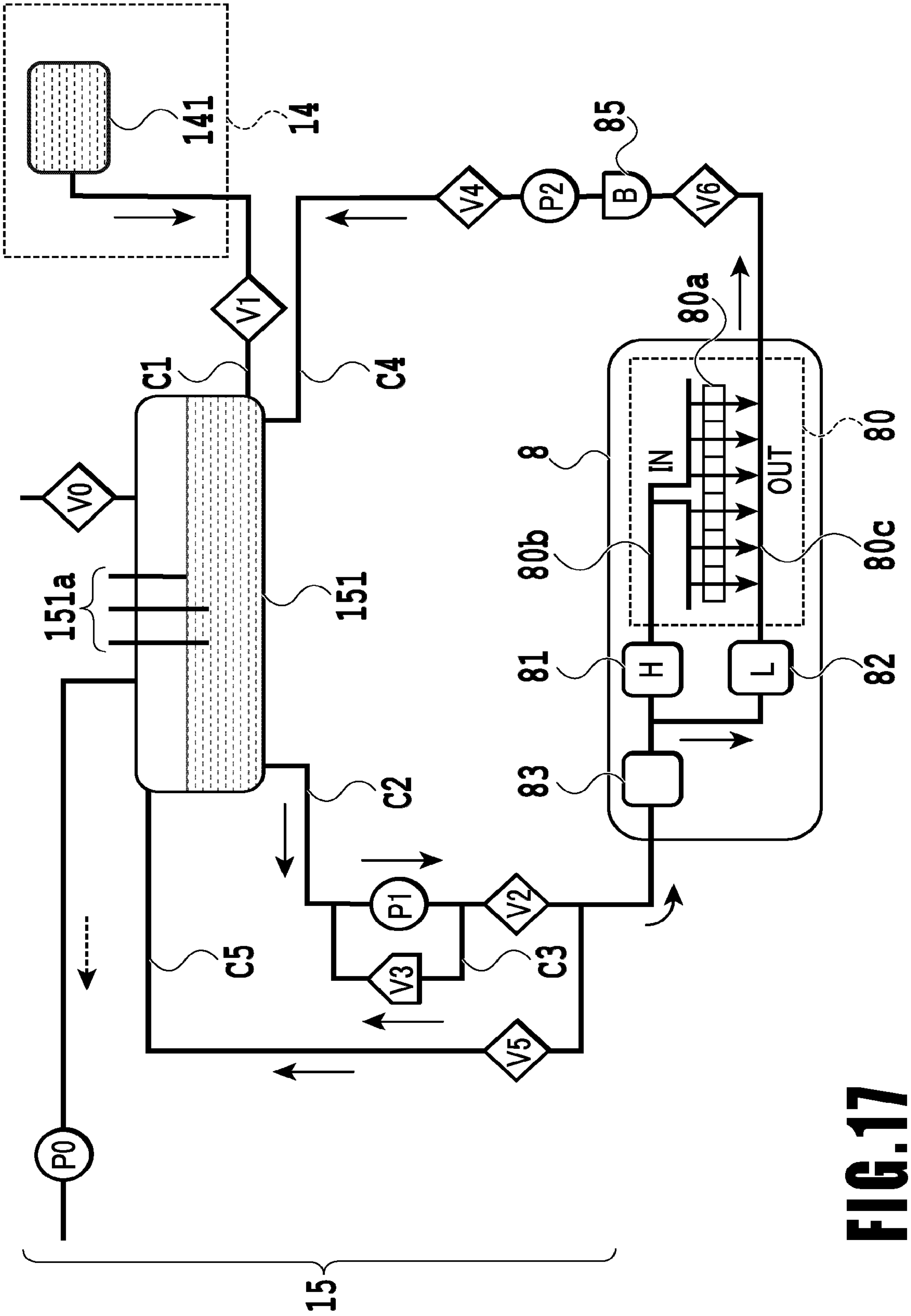
FIG. 17 is a diagram illustrating a flow path configuration of an ink circulation system.

Next, another configuration of reducing the FPOT will be described. FIG. 17 is a diagram illustrating the ink circulation system of the present embodiment. In the present embodiment, as shown in FIG. 17, the buffer chamber shutoff valve V6 is disposed upstream of the buffer chamber 85 in the collection flow path C4. The buffer chamber shutoff valve V6 is a drive valve capable of driving between open/closed states under control made by the ink supply control unit 209. In the present embodiment, the ink supply control unit 209 closes the buffer chamber shutoff valve V6 upon stopping the ink circulation. As a result, the buffer chamber 85 retains a state where a pressure (negative pressure) is applied during circulation. Therefore, the buffer chamber 85 is retained to be in a contracted state, that is, in the first state. Accordingly, in a case of starting subsequent print operation as well, the buffer chamber 85 is retained in the first state so that a time period required for the buffer chamber 85 to make contraction can be reduced. For this reason, the FPOT can be reduced. In a case where the buffer chamber shutoff valve V6 does not exist, or the buffer chamber shutoff valve V6 is kept to be in the open state, the buffer chamber 85 becomes in the expanded state compared to the first state at the time of stopping the circulation. This is because that, at the time of stopping the operation of the collection pump P2, ink flow stops and the contracted part expands by a pressure loss or ink enters the buffer chamber 85 from its upstream side.

Figure 18:
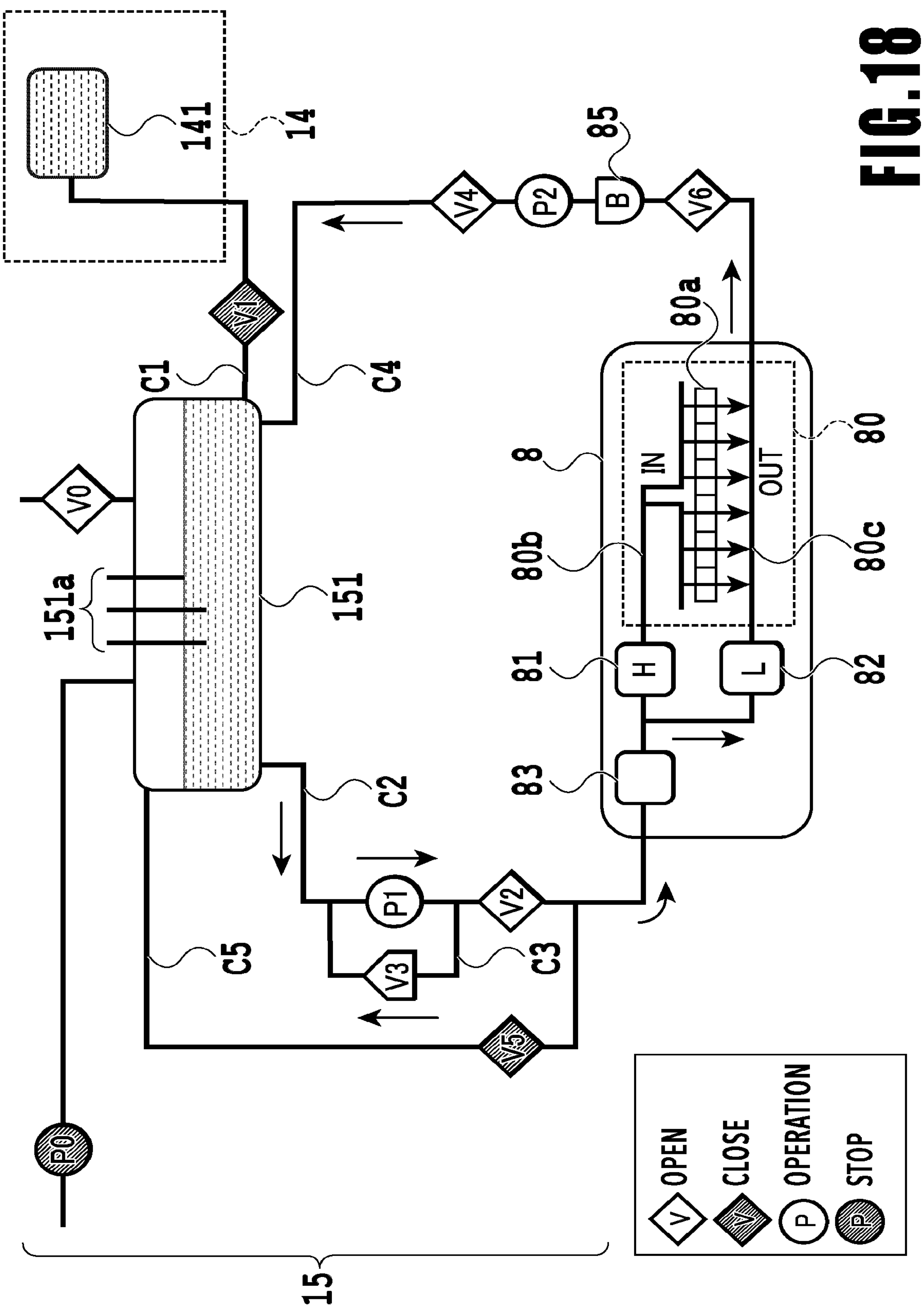
FIG. 18 is a diagram showing open/closed states of valves and driving states of pumps.

FIG. 18 is a diagram showing open/closed states of valves and driving states of pumps in the circulation flow path in the case of performing ink circulation in the circulation system shown in FIG. 17. During print operation, ink circulation is made as shown in FIG. 18. During the ink circulation, the tank supply valve V1 and the head replacement valve V5 are in a closed state. The vacuum pump P0 is in a stopped state. Meanwhile, the atmosphere release valve V0, the supply valve V2, the collection valve V4, and the buffer chamber shutoff valve V6 are in an open state. The supply pump P1 and the collection pump P2 are in an operating state. In the case where ink circulation is made as such, the buffer chamber 85 is in the first state as shown in FIG. 13A. In other words, the buffer chamber 85 is in the completely contracted state due to a negative pressure.

Figure 19:
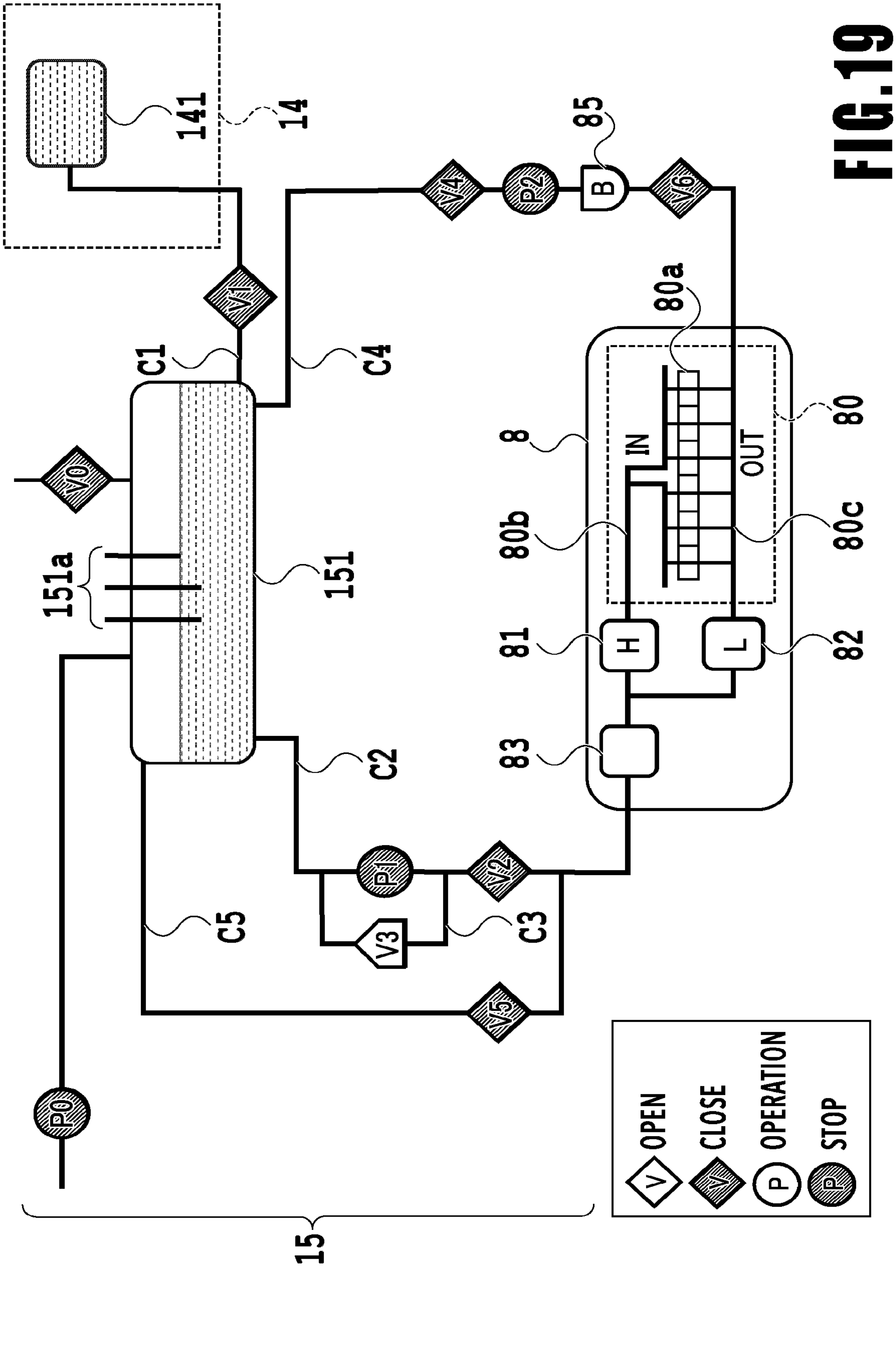
FIG. 19 is a diagram showing open/closed states of the valves and driving states of the pumps.

FIG. 19 is a diagram showing open/closed states of the valves and driving states of the pumps in the circulation flow path in the case of stopping ink circulation in the circulation system shown in FIG. 17. In the case of the completion of print operation, ink circulation is in a stopped state as shown in FIG. 19. The atmosphere release valve V0, the supply valve V2, the collection valve V4, and the buffer chamber shutoff valve V6 are in a closed state, which are different from those in the case of FIG. 18. In addition, the supply pump P1 and the collection pump P2 are in a stopped state. In the present embodiment, in the case of stopping ink circulation, the buffer chamber shutoff valve V6 is controlled to be closed. Accordingly, the buffer chamber 85 in the case of stopping the ink circulation is also in a state close to the first state shown in FIG. 13A. Depending on a timing of closing the buffer chamber shutoff valve V6, the buffer chamber 85 may be slightly expanded from the first state, but is often in a state having smaller volume than the third state shown in FIG. 13C. As such, the buffer chamber 85 is retained in a state where a negative pressure is applied at the time of circulation and is in a completely contracted state (or close to contracted state). For this reason, in the case where a printing instruction is outputted to restart the ink circulation as shown in FIG. 18, a time period required for the contraction of the buffer chamber 85 can be reduced, thereby reducing the FPOT.

Figure 20:
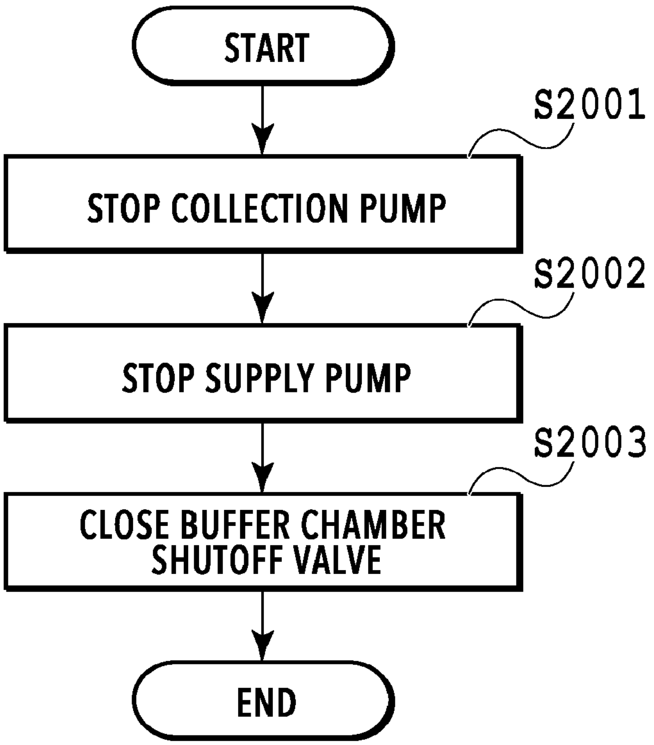
FIG. 20 is a flowchart in a case of stopping ink circulation.

FIG. 20 is a diagram showing one example of a flowchart in the case of stopping ink circulation from the ink circulating state. In the case where the ink supply control unit 209 is notified from the print controller 202 that, for example, the print operation is completed, processes for stopping the ink circulation as shown in FIG. 20 are to be performed.

In Step S2001, the ink supply control unit 209 stops the collection pump P2. In Step S2002, the ink supply control unit 209 stops the supply pump P1. In Step S2003, the ink supply control unit 209 closes the buffer chamber shutoff valve V6. It should be noted that, although the form of making the processes in order has been presented, part of the processes or all of the processes from Step S2001 to Step S2003 may be performed in parallel. Further, although not shown in FIG. 20, operation of closing the supply valve V2, for example, is simultaneously made. It should be noted that, in the example of FIG. 20, the form of performing processes to stop the ink circulation shown in FIG. 20 in the case where the completion of the print operation is notified from the print controller 202 has been described, but the present invention is not limited to this. The processes shown in FIG. 20 may be performed in a case where an instruction which is to be a trigger to stop the ink circulation is notified from the print controller 202.

In the present embodiment, as described above, the buffer chamber 85 is disposed in the flow path that is communicated with the ejection opening and the buffer chamber shutoff valve V6 is disposed upstream of the buffer chamber 85 in the case where ink circulation is stopped. Further, in the case of stopping the ink circulation, the ink supply control unit 209 makes control to close the buffer chamber shutoff valve V6. Accordingly, in the case of stopping the ink circulation, the buffer chamber 85 is retained in a state where a negative pressure is applied at the time of circulation, thereby retaining the completely contracted state. For this reason, in the case where the printing instruction is inputted to restart the ink circulation, a time period required for the contraction of the buffer chamber 85 can be reduced, thereby reducing the FPOT.

Third Embodiment

In the second embodiment, the form of making control to close the buffer chamber shutoff valve V6 in the case of stopping the ink circulation has been described. Such control is effective in that the FPOT can be reduced in the state of starting the print operation in a relatively short time after the stop of the print operation. However, the role of the buffer chamber 85 prevents ink from leaking from the ejection opening and prevents atmosphere from being sucked from the ejection opening as a result of absorbing the shrinkage or expansion of bubbles due to environmental changes as described above. If the buffer chamber shutoff valve V6 is kept in a closed state, the intrinsic function of the buffer chamber 85 cannot be exerted.

In the present embodiment, in a case where a predetermined time period has elapsed from the stop of ink circulation to be shifted to a standby mode, control is made to open the buffer chamber shutoff valve V6. Accordingly, the intrinsic function of the buffer chamber 85 is exerted. A predetermined time period is a period that is presumed to be out of use for a long period of time, and can be set to any time period. In the present embodiment, the predetermined time period is set to be 1 to 2 hours, for example.

Figure 21:
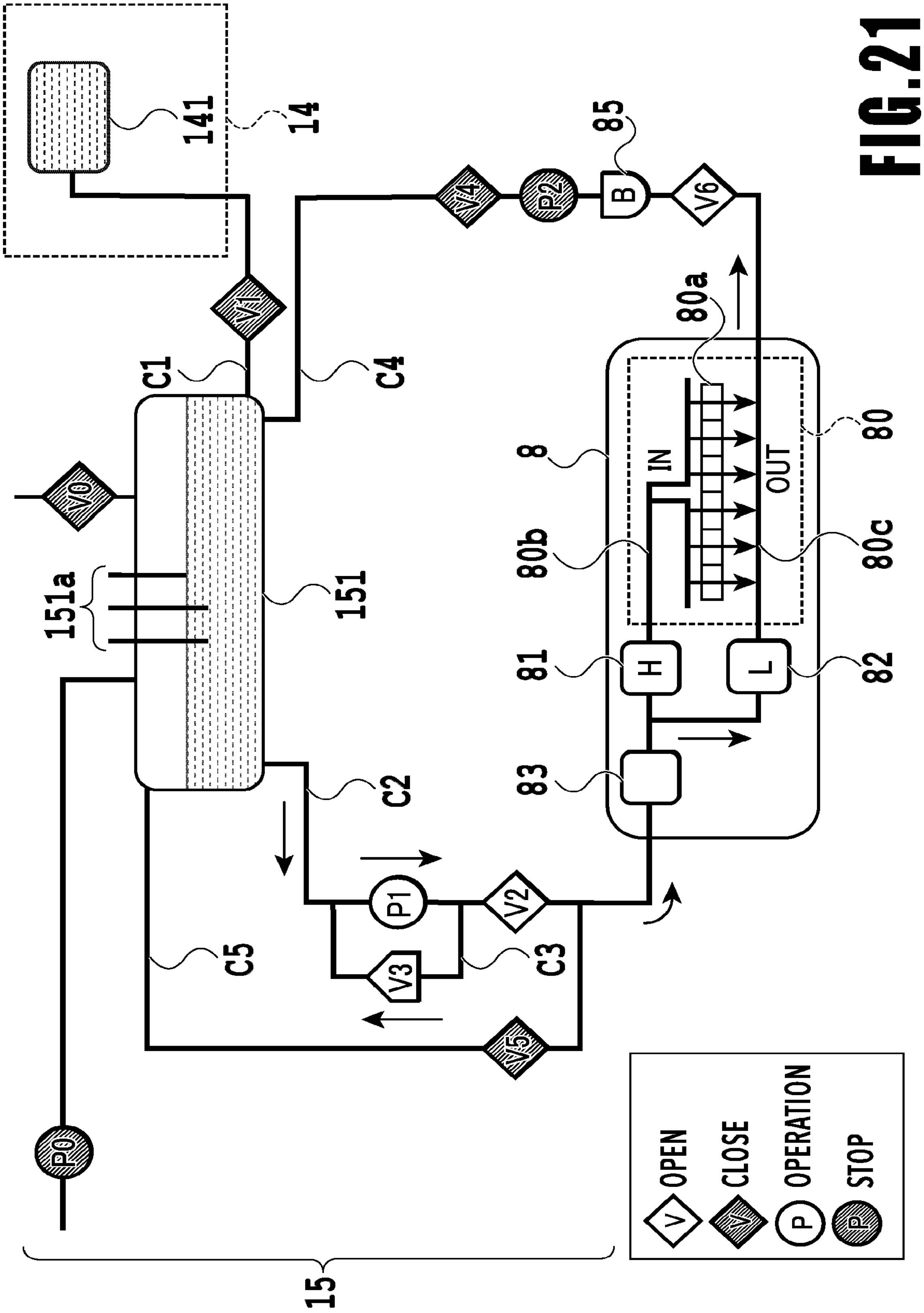
FIG. 21 is a diagram showing open/closed states of the valves and driving states of the pumps.

FIG. 21 is a diagram showing open/closed states of the valves and driving states of the pumps in the circulation flow path in the case of shifting to the standby mode after a lapse of predetermined time period from the stop of the ink circulation in the circulation system shown in FIG. 17. In FIG. 21, the buffer chamber shutoff valve V6 is in an open state, which is different from the case where the ink circulation is stopped as shown in FIG. 19. By opening the buffer chamber shutoff valve V6, ink leakage from the ejection opening or atmosphere suction from the ejection opening can be prevented.

Furthermore, FIG. 21 shows a state where the supply valve V2 is open and the supply pump P1 is operated, which are different from those in the case where ink circulation is stopped as shown in FIG. 19. This is because that, there may be a case where, by opening the buffer chamber shutoff valve V6, as described in the first embodiment, ink enters the buffer chamber 85 and the buffer chamber 85 that had been completely contracted starts to expand, but thereafter, a volume (buffer) for absorbing an amount for bubble shrinkage cannot be ensured. To cope with this, in the present embodiment, by opening the supply valve V2 to temporarily drive the supply pump P1, ink flows into the buffer chamber 85. Thereafter, the supply valve V2 is closed to stop the operation of the supply pump P1. FIG. 13C shows a state of the buffer chamber 85 in the third state in the standby mode, that is, a state where ink flows into the buffer chamber 85 so that the buffer chamber 85 is expanded compared to the state during circulation as shown in FIG. 13A.

Figure 22:
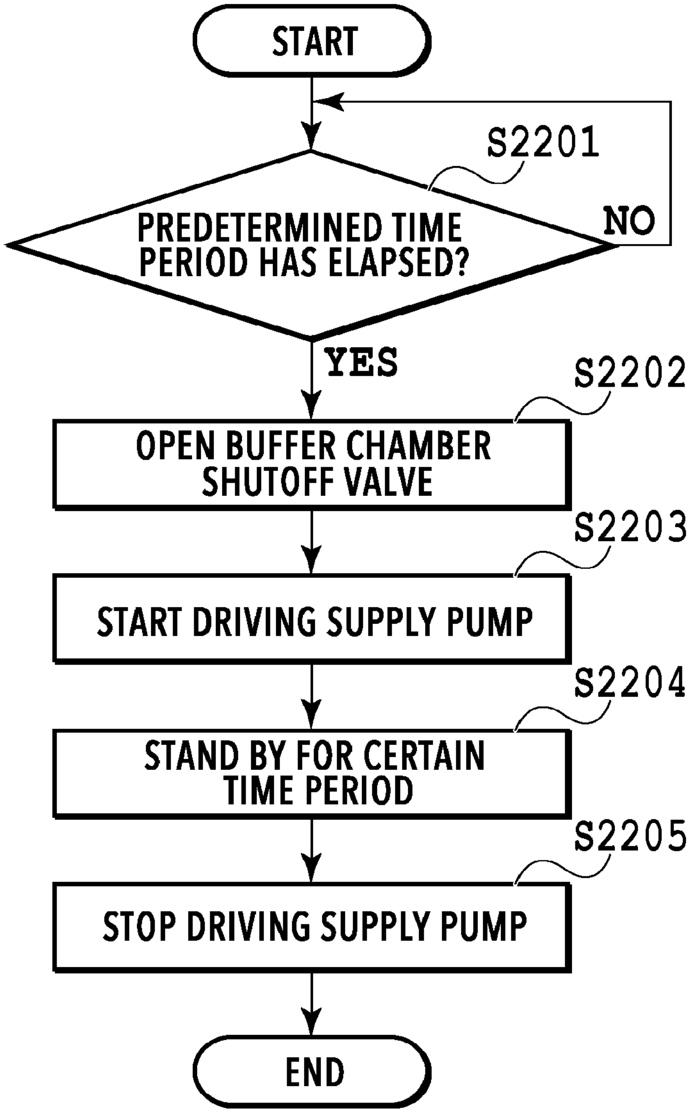
FIG. 22 is a diagram showing one example of a flowchart in a case of shifting to a standby state.

FIG. 22 is a diagram showing one example of a flowchart in a case of shifting to the standby mode from the state where ink circulation is stopped. Processes in FIG. 22 are performed subsequent to Step S2003 in the flowchart shown in FIG. 20. In Step S2201, the ink supply control unit 209 refers to a non-illustrated timer value, and if a predetermined time period has been elapsed, the process advances to Step S2202. In Step S2202, the ink supply control unit 209 opens the buffer chamber shutoff valve V6. In Step S2203, the ink supply control unit 209 opens the supply valve V2 to operate the supply pump P1. In Step S2204, the ink supply control unit 209 stands by for a certain time period (for example, one minute). This standby time refers to a time period required from the ink entering the buffer chamber 85 to the expansion of the buffer chamber 85. In Step S2205, the ink supply control unit 209 stops the operation of the supply pump P1, and further, closes the supply valve V2.

As described above, according to the present embodiment, in a case where the apparatus is presumed to be out of use for a long time, the buffer chamber shutoff valve V6 is opened to exert the intrinsic function of the buffer chamber 85. As a result, ink leakage from the ejection opening or atmosphere suction from the ejection opening can be prevented.

Incidentally, in the present embodiment, the example of using a fixed value arbitrarily set as a predetermined time period has been described, but the present invention is not limited to this. Such a predetermined time period may be varied in a case where the inkjet printing apparatus 1 includes a sensor for measuring environmental changes (for example, a temperature change) and where bubble shrinkage or expansion is assumed to occur depending on measurement results. In other words, a predetermined time period in Step S2201 may be changed to a second time, which differs from the preset first time.

Fourth Embodiment

In the second and third embodiments, the form of providing one buffer chamber 85 has been described as an example, but the present invention is not limited to this. For instance, there may be a case where, due to size restrictions and other reasons, the buffer chamber 85 having a size sufficient for absorbing a volume for both the bubble shrinkage and expansion cannot be arranged. In such a case, a first buffer chamber which absorbs a volume for the bubble shrinkage and a second buffer chamber which absorbs a volume for the bubble expansion can be provided. As such, providing the buffer chambers for respective functions allows reducing the sizes of the buffer chambers. The first buffer chamber and the second buffer chamber have a basic configuration identical to the above-described buffer chamber 85, and have different spring pressures for the respective compression springs.

Fifth Embodiment

In the present embodiment, the form of a combination of the form described in any one of the second to fourth embodiments and the form described in the first embodiment will be described below.

A flow path configuration of the present embodiment includes, as in FIG. 17, the buffer chamber shutoff valve V6 located upstream of the buffer chamber 85 in the collection flow path C4. Further, as shown in FIG. 19, the ink supply control unit 209 according to the present embodiment makes control to close the buffer chamber shutoff valve V6 at the time of stopping ink circulation. Accordingly, the buffer chamber 85 is retained in a state where pressure (negative pressure) is applied during circulation. Therefore, the buffer chamber 85 is, as shown in FIG. 13A, expected to be retained in a state close to the first state, which is the completely contracted state. As a result, in a case where print operation is repeated for a short period of time, the FPOT can be reduced.

However, depending on a timing to close the buffer chamber shutoff valve V6, there may be a case where the buffer chamber 85 is retained in a slightly expanded state. Further, in the case of being out of use for a long period, as described in the third embodiment, control is made to open the buffer chamber shutoff valve V6 for causing the buffer chamber 85 to exert its function. In this case as well, the buffer chamber 85 is in an expanded state.

In the present embodiment, as in the first embodiment, at the time of starting ink circulation, a flow rate of the collection pump P2 is increased compared to a flow rate during normal ink circulation (during print operation) for a certain time period. Accordingly, the buffer chamber 85 can be contracted in a short time period even in the case where the buffer chamber shutoff valve V6 is provided, and thus, the FPOT can be reduced.

Other Embodiments

Figure 23:
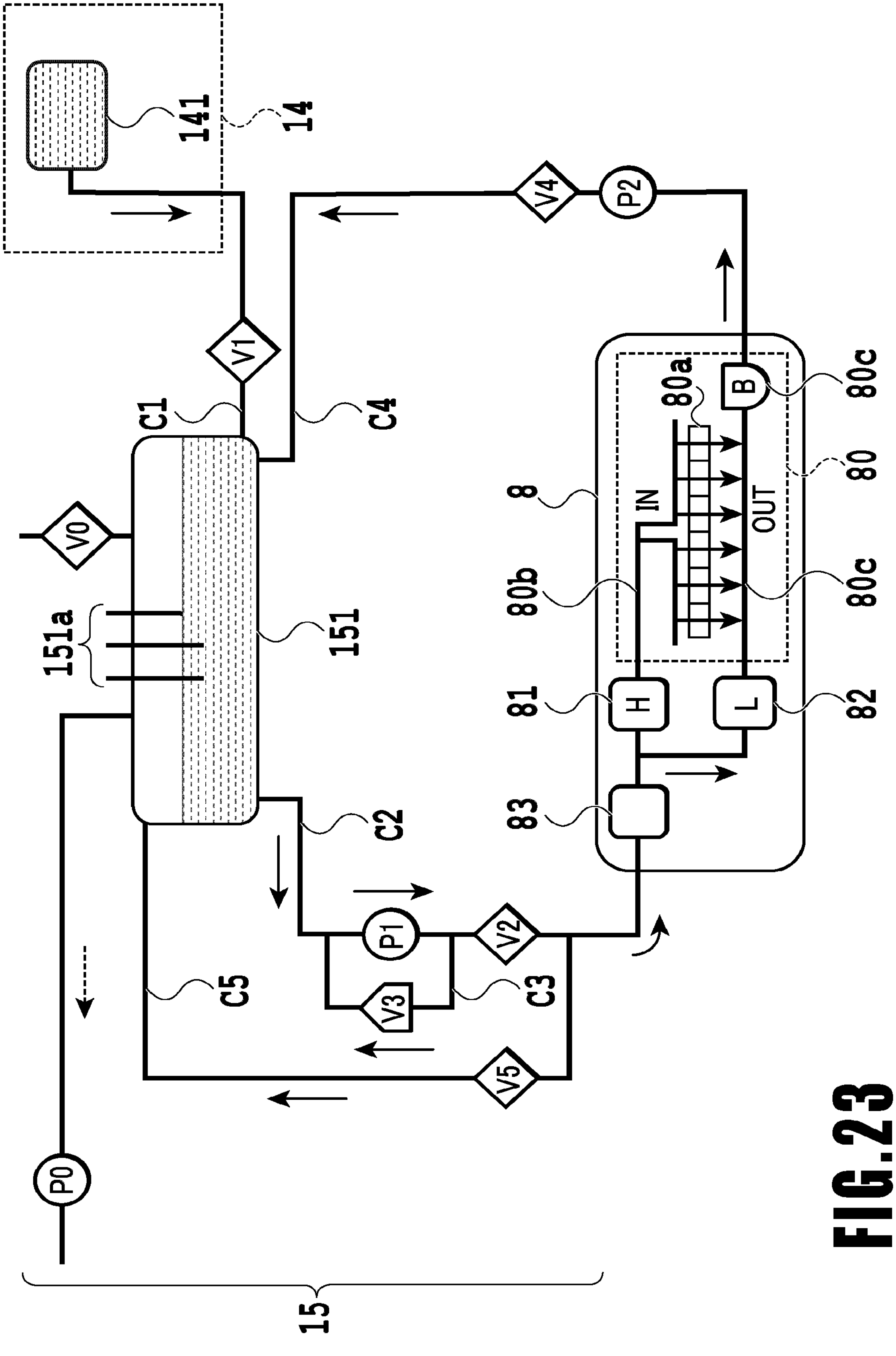
FIG. 23 is a diagram illustrating a flow path configuration of an ink circulation system.

The form of disposing the buffer chamber 85 in the collection flow path C4 has been described, but the present invention is not limited to this. As shown in FIG. 23, the buffer chamber 85 may be disposed in the flow path inside the head unit 8. To be more specific, the buffer chamber 85 may be disposed downstream of the pressure control unit inside the head unit 8. In other words, the buffer chamber 85 may be disposed downstream of the first negative pressure control unit 81 and the second negative pressure control unit 82. In addition, the buffer chamber shutoff valve V6 may be disposed upstream (ejection opening side) of the buffer chamber 85.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-133664, filed Jul. 7, 2017, and No. 2017-133779, filed Jul. 7, 2017, which are hereby incorporated by reference wherein in their entirety.

What is claimed is:

1. A printing apparatus comprising:

a tank configured to store liquid to be supplied to a print head which ejects the liquid to a print medium to perform printing;

a first path configured to connect the tank and the print head;

a second path configured to connect the tank and the print head;

a third path branching from the first path;

a valve provided in the third path and configured to open the third path and to close the third path, wherein in a case where the print head performs printing, the valve is closed;

a pump configured to flow the liquid so that the liquid flows from the first path to the print head and from the print head to the second path; and a control unit configured to perform first control so that a flow rate of the liquid caused to flow in the second path by the pump is a first target flow rate and to perform second control so that a flow rate of the liquid caused to flow in the second path by the pump is a second target flow rate greater than the first target flow rate.

2. The printing apparatus according to claim 1, wherein in the first control, the control unit drives the pump in a first driving amount, and wherein in the second control, the control unit drives the pump in a second driving amount greater than the first driving amount.

3. The printing apparatus according to claim 1, further comprising an operating panel to allow a user to do input and output for the printing apparatus.

4. The printing apparatus according to claim 1, further comprising an interface unit for acquiring information from an external apparatus.

5. The printing apparatus according to claim 1, wherein the print head comprises an ejection opening surface provided with an ejection opening from which the liquid is ejected, and wherein in a case where the print head performs printing, the ejection opening surface is parallel to and faces a platen.

6. The printing apparatus according to claim 1, wherein the print head is configured to eject different types of liquid.

7. The printing apparatus according to claim 1, further comprising a valve provided in the first path.

8. The printing apparatus according to claim 1, further comprising a valve provided in the second path.

9. A printing apparatus comprising:

a tank configured to store liquid to be supplied to a print head which ejects the liquid to a print medium to perform printing;

a first path configured to connect the tank and the print head;

a second path configured to connect the tank and the print head;

a third path branching from the first path;

a valve provided in the third path and configured to open the third path and to close the third path, wherein in a case where the print head performs printing, the valve is closed;

a pump configured to flow the liquid so that the liquid flows from the first path to the print head and from the print head to the second path; and a control unit configured to perform first control so that a driving amount of the pump is a first target amount and to perform second control so that a driving amount of the pump is a second target amount greater than the first target amount.

10. The printing apparatus according to claim 9, further comprising an operating panel to allow a user to do input and output for the printing apparatus.

11. The printing apparatus according to claim 9, further comprising an interface unit for acquiring information from an external apparatus.

12. The printing apparatus according to claim 9, wherein the print head comprises an ejection opening surface provided with an ejection opening from which the liquid is ejected, and wherein in a case where the print head performs printing, the ejection opening surface is parallel to and faces a platen.

13. The printing apparatus according to claim 9, wherein the print head is configured to eject different types of liquid.

14. The printing apparatus according to claim 9, further comprising a valve provided in the first path.

15. The printing apparatus according to claim 9, further comprising a valve provided in the second path.

16. A circulation apparatus comprising:

a first pump configured to circulate liquid; and a second pump configured to circulate the liquid, wherein the circulation apparatus circulates the liquid by driving the first pump and the second pump, supplying the liquid to a pressure chamber which is a space facing an energy generating unit provided on a head having an ejection opening for ejecting the liquid and configured to generate energy for ejecting the liquid from the ejection opening, and collecting, from the pressure chamber, the liquid which is not ejected from the ejection opening, and wherein the circulation apparatus performs a first circulation operation by driving the first pump and the second pump so that a flow rate of the liquid circulated by the first pump and the second pump is a first target flow rate, and performs a second circulation operation by driving the first pump and the second pump so that a flow rate of the liquid circulated by the first pump and the second pump is a second target flow rate greater than the first target flow rate.

17. The circulation apparatus according to claim 16, further comprising an interface unit for acquiring information from an external apparatus.

18. The circulation apparatus according to claim 16, wherein the print head comprises an ejection opening surface provided with the ejection opening, and wherein in a case where the print head ejects the liquid to a print medium to perform printing, the ejection opening surface is parallel to and faces a platen.

19. The circulation apparatus according to claim 16, wherein the print head is configured to eject different types of liquid.

20. A control method of a printing apparatus, the printing apparatus including (a) a tank configured to store liquid to be supplied to a print head which ejects the liquid to a print medium to perform printing, (b) a first path configured to connect the tank and the print head, (c) a second path configured to connect the tank and the print head, (d) a third path branching from the first path, (e) a valve provided in the third path and configured to open the third path and to close the third path, wherein in a case where the print head performs printing, the valve is closed, and (f) a pump configured to flow the liquid so that the liquid flows from the first path to the print head and from the print head to the second path; the control method comprising:

performing first control so that a flow rate of the liquid caused to flow in the second path by the pump is a first target flow rate; and performing second control so that a flow rate of the liquid caused to flow in the second path by the pump is a second target flow rate greater than the first target flow rate.

21. A control method of a printing apparatus, the printing apparatus including (a) a tank configured to store liquid to be supplied to a print head which ejects the liquid to a print medium to perform printing, (b) a first path configured to connect the tank and the print head, (c) a second path configured to connect the tank and the print head, (d) a third path branching from the first path, (e) a valve provided in the third path and configured to open the third path and to close the third path, wherein in a case where the print head performs printing, the valve is closed, and (f) a pump configured to flow the liquid so that the liquid flows from the first path to the print head and from the print head to the second path; the control method comprising:

performing first control so that a driving amount of the pump is a first target amount; and performing second control so that a driving amount of the pump is a second target amount greater than the first target amount.

22. A control method of a circulation apparatus, the circulation apparatus including (a) a first pump configured to circulate liquid, and (b) a second pump configured to circulate the liquid; wherein the circulation apparatus circulates the liquid by driving the first pump and the second pump, supplying the liquid to a pressure chamber which is a space facing an energy generating unit provided on a head having an ejection opening for ejecting the liquid and configured to generate energy for ejecting the liquid from the ejection opening, and collecting, from the pressure chamber, the liquid which is not ejected from the ejection opening, the control method comprising:

performing a first circulation operation by driving the first pump and the second pump so that a flow rate of the liquid circulated by the first pump and the second pump is a first target flow rate; and performing a second circulation operation by driving the first pump and the second pump so that a flow rate of the liquid circulated by the first pump and the second pump is a second target flow rate greater than the first target flow rate.

* * * * *